(12) United States Patent
Dullea et al.

(10) Patent No.: US 12,259,210 B1
(45) Date of Patent: Mar. 25, 2025

(54) ACTUATED FLYWHEEL PROJECTILE LAUNCHER

(71) Applicant: National Technology & Engineering Solutions of Sandia, LLC, Albuquerque, NM (US)

(72) Inventors: Kevin J. Dullea, Albuquerque, NM (US); Noah R. Jackson, Edgewood, NM (US); David K. Novick, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 45 days.

(21) Appl. No.: 18/110,557

(22) Filed: Feb. 16, 2023

(51) Int. Cl.
| | | |
|---|---|---|
| *F41B 4/00* | (2006.01) | |
| *A63B 69/40* | (2006.01) | |
| *A01K 11/00* | (2006.01) | |
| *B64U 20/80* | (2023.01) | |
| *B64U 101/40* | (2023.01) | |
| *B64U 101/45* | (2023.01) | |
| *F42B 12/36* | (2006.01) | |
| *H02K 7/02* | (2006.01) | |

(52) U.S. Cl.
CPC ............... *F41B 4/00* (2013.01); *A63B 69/40* (2013.01); *A63B 69/406* (2013.01); *A01K 11/005* (2013.01); *B64U 20/80* (2023.01); *B64U 2101/40* (2023.01); *B64U 2101/45* (2023.01); *B64U 2201/104* (2023.01); *F42B 12/362* (2013.01); *H02K 7/025* (2013.01)

(58) Field of Classification Search
CPC ........ F41B 4/00; F41B 12/362; A01K 11/005; A63B 69/40; A63B 69/406

USPC ........................................................... 124/78
See application file for complete search history.

(56) References Cited

U.S. PATENT DOCUMENTS

| 4,193,591 A * | 3/1980 | Paulson ............... A63B 69/406 |
| | | 124/78 |
| 4,352,348 A * | 10/1982 | Griffith ................ A63B 69/406 |
| | | 124/78 |
| 4,922,885 A * | 5/1990 | Iwabuchi ............. A63B 69/406 |
| | | 124/78 |
| 2002/0082125 A1* | 6/2002 | Markin ................ A63B 69/406 |
| | | 473/451 |

(Continued)

FOREIGN PATENT DOCUMENTS

WO     WO2023235910    * 12/2023 ............. A63B 69/40

*Primary Examiner* — John E Simms, Jr.
(74) *Attorney, Agent, or Firm* — Daniel J. Jenkins; Kenneth P. McNeill

(57) ABSTRACT

Various embodiments include an actuated projectile launcher, including: a base structure; a projectile support, and a holding area from which a projectile launches; propulsion wheels selectively driven to rotate; and support arms, each supporting at a first end thereof a separate one of the propulsion wheels and being supported at an opposed second end thereof by the base structure. The support arms are configured to move the propulsion wheels between an expanded position and a contracted position, in which the propulsion wheels are closer to one another in the contracted position as compared to the expanded position. The movement of the propulsion wheels toward the contracted position brings the propulsion wheels into engagement with the projectile and drives the projectile from the holding area.

29 Claims, 16 Drawing Sheets

(56) References Cited

U.S. PATENT DOCUMENTS

2002/0134366 A1\* 9/2002 Rehkemper .............. F41B 4/00
                                                                                                          124/78
2016/0193520 A1\* 7/2016 Hart ..................... A63B 69/406
                                                                                                           124/78

\* cited by examiner

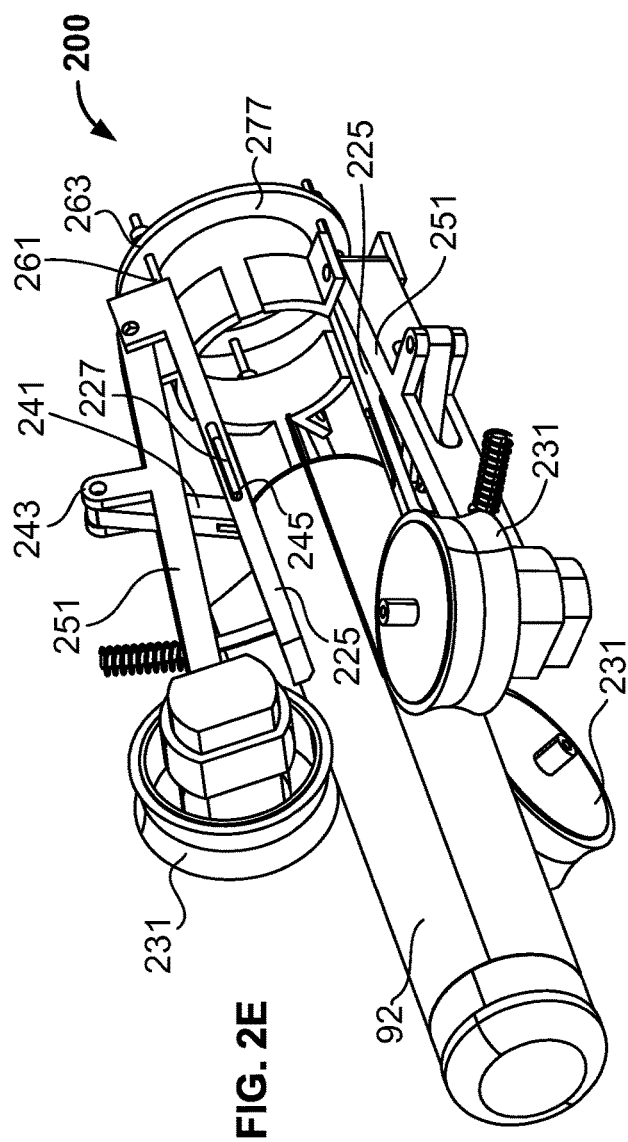
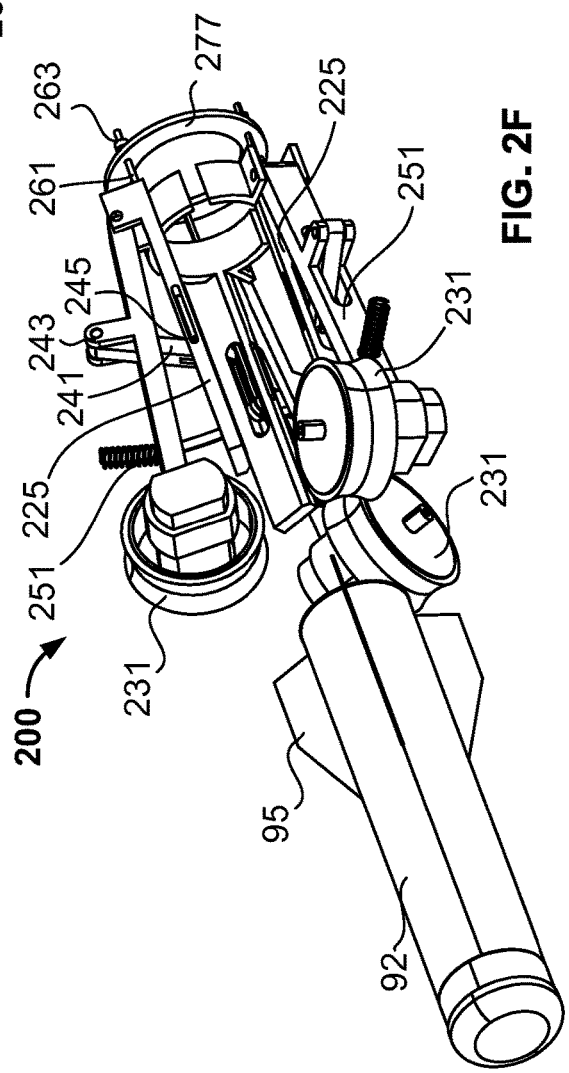

ACTUATED FLYWHEEL PROJECTILE LAUNCHER

STATEMENT REGARDING FEDERALLY SPONSORED RESEARCH OR DEVELOPMENT

Described examples were made with Government support under Contract No. DE-NA0003525 awarded by the United States Department of Energy/National Nuclear Security Administration. The U.S. Government has certain rights in this invention.

BACKGROUND

Illnesses among cattle can spread quickly and infect an entire herd, especially in crowded feed lots. The sooner these cattle are diagnosed, separated, and treated, the fewer cattle that could get infected. Cattle are prey animals, thus when a threat is present, their instinct is to hide their symptoms and get lost in the herd. However, cattle can quickly get used to a small UAV and will feel comfortable enough to separate from the herd and display their symptoms even when within the vicinity of a UAV to which they have become accustomed. Using a UAV with a camera, an observer of a herd may spot and quickly diagnose at least one of them as being sick. However, when the observer or a handler approaches the sick one, the cattle's instincts kick-in and it tries to get lost in the herd. Thus, there is a need for an apparatus, system, and/or method for marking cattle, such as to identify ones with illness or otherwise distinguish members of the herd. Additionally, it may be advantageous if such an apparatus, system, and/or method could be adapted to launch various different types of projectiles, deliver different types of payloads (i.e., not limited to marking), and/or be carried by different types of platforms.

SUMMARY

The systems, methods, and devices of the present invention include an actuated projectile launcher, including: a base structure; a projectile support configured to maintain a projectile in a holding area from which the projectile launches; two or more propulsion wheels selectively driven to rotate; and two or more support arms, each supporting at a first end thereof a separate one of the two or more propulsion wheels and being supported at an opposed second end thereof by the base structure. The two or more support arms may be configured to move the two or more propulsion wheels between an expanded position and a contracted position. The two or more propulsion wheels may be closer to one another in the contracted position as compared to the expanded position. The movement of the two or more propulsion wheels toward the contracted position may be configured to bring the two or more propulsion wheels into engagement with the projectile and drive the projectile from the holding area.

In some embodiments, each of the two or more propulsion wheels is a flywheel configured to store rotational energy imparted by a motor and transfer that stored rotational energy to the projectile through direct engagement therewith. The actuated projectile launcher may further include an over-center linkage configured to guide at least one of the two or more support arms between the expanded position and the contracted position, wherein the over-center linkage includes separate over-center links for each of the two or more support arms, wherein each of the over-center links is coupled at a first end to a different one of the two or more support arms and coupled at a second end to the base structure. The second end of each of the over-center links may be configured to slide linearly along a segment of the base structure while maintaining the coupling to the base structure. The second end of each of the over-center links may be secured to a guidepost configured to slide along a track that is fixed relative to the base structure while maintaining the coupling of the over-center link to the base structure. The second end of two over-center links may be secured to the same guidepost. The actuated projectile launcher may further include an actuator configured to move the second end of the over-center links between a first position and a second position, wherein movement by the actuator of the second end into the first position moves the two or more propulsion wheels into the expanded position and movement by the actuator of the second end into the second position moves the two or more propulsion wheels into the contracted position. The second end of each of the over-center links may be secured to a guidepost, wherein the actuator includes a trigger bar in sliding engagement with the guidepost, wherein the trigger bar includes a pair of trigger blocks disposed on opposed sides of the guidepost limiting a linear extend of movement of the guidepost along the trigger bar. The actuator may include two or more guideposts, wherein the second end of each of the over-center links is secured to a guidepost, wherein the actuator includes a separate trigger bar secured to each of the two or more guideposts for moving the second end of the over-center links between the first position and the second position. The actuator may include a trigger ring in sliding engagement with the separate trigger bars, wherein each of the separate trigger bars include a pair of trigger blocks disposed on opposed sides of the trigger ring limiting a linear extend of movement of the trigger ring along the separate trigger bars. The projectile may be configured to be loaded into the holding area tangentially relative to a launch direction in which the projectile is driven from the holding area by the two or more propulsion wheels. The two or more propulsion wheels may include at least three propulsion wheels and the two or more support arms include at least three support arms, wherein each of the at least three propulsion wheels is secured to a separate one of the at least three pivoting support arms. The at least three support arms may share a mechanical linkage configured to move the at least three support arms in unison.

An advantage of the present disclosure is that by adding a device to a UAV that can temporarily mark cattle for identification with a visual marker, a handler can subsequently visually identify and separate the cattle based on the temporary mark. Such temporary marks may be used to diagnose, identify, and/or separate cattle. In addition, by providing effective and efficient cattle marking systems, an entire herd can be selectively marked as needed.

Another advantage of various embodiments is that the moveable propulsion wheel design enables the mobile projectile launching system to launch projectiles of various different diameters, lengths, and/or sizes. Also, the projectiles themselves may deliver a wide variety of payloads.

Another advantage of various embodiments is that by including propulsion wheels with compliant surfaces configured to grip the projectiles, the projectiles themselves may be made with a simpler design that can be more readily disposable and/or even biodegradable. For example, the projectiles may be 3-D printed from water soluble materials, which will not harm cattle if consumed by them after the payload is delivered.

An additional advantage of various embodiments is that the actuated flywheel projectile launcher in accordance with various embodiments may be configured to be easily secured to a variety of different UAVs. In this way, the system may be integrated into existing equipment used for cattle surveillance and convert such systems into cattle marking systems. Using UAVs in this way is particularly advantageous because cattle easily get accustomed to the UAVs and will not hide in the herd when the UAV approaches, which enable observation and targeting of cattle separated from the herd.

These and other features, objects, and advantages of the present disclosure will be further understood and apparent from the following specification, claims, and appended drawings.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 2A-2H are perspective views of a three-wheeled actuated projectile launcher in various stages of launching a projectile in accordance with various embodiments.

DETAILED DESCRIPTION

Figure 1A:
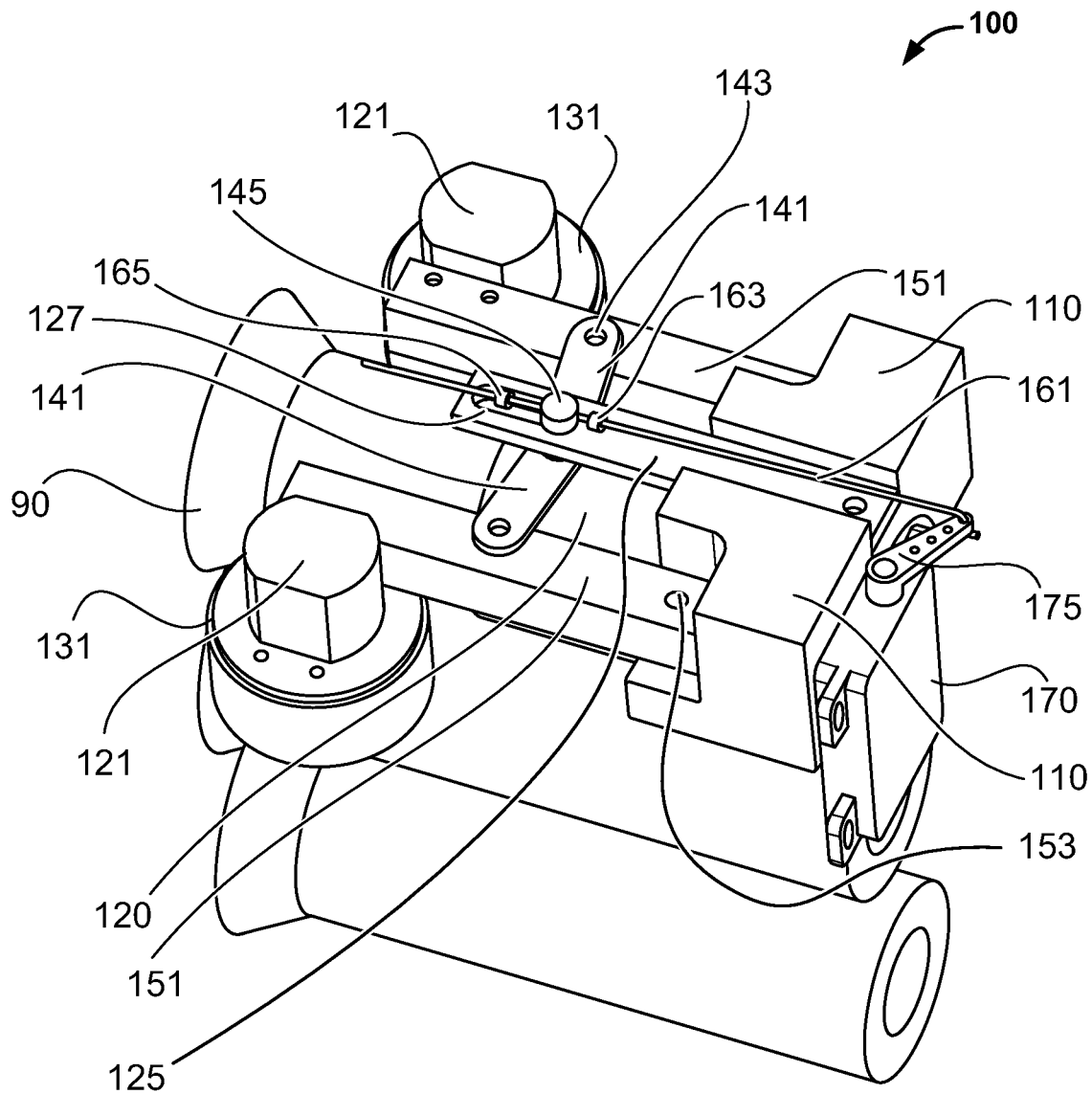
FIGS. 1A-1G are perspective views of a two-wheeled actuated projectile launcher in various stages of launching a projectile in accordance with various embodiments.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

Various embodiments are directed to systems, devices, and methods for launching projectiles. In particular, various embodiments include a multi-propulsion wheel assembly, and particularly an actuated flywheel device (AFD). In some embodiments, the AFD is a projectile launching system, which may be attached to a platform, such as a stationary platform or a mobile platform. An example of a mobile platform particularly suited for various embodiments is an unmanned aerial vehicle (UAV), such as one for delivering a marking projectile, like a dart, that can be propelled from an elevated position above the ground. Various embodiments may trigger the AFD using an existing remote control channel or command, such as a UAV light switch that may be used to trigger one or more servo controllers used to activate the AFD and launch the projectile. The projectile launching system may be used to mark cattle exhibiting illness or otherwise needing to be separated or distinguished from other cattle in a herd. The projectile launching system can alternatively be used to launch a variety of different types of projectiles, including for delivery of payloads other than marking materials.

Rather than using propulsion wheels with a fixed spacing, various embodiment may pivot or slide the propulsion wheels toward one another to grab and propel a projectile, which may enable the launcher to launch projectiles of various width, lengths, or having other variable design aspects. The propulsion wheels may be flywheels that get spun while separated from the projectile, then pivoted or slid toward one another and the projectile once the flywheels reach full speed. Once the flywheels are pivoted or slid into engagement with the projectile, the projectile will be launched from the actuated projectile launcher.

The projectile launching system may be configured such that the projectile may be inserted into the holding area between the propulsion wheels before launch from the front, aft, or tangentially (i.e., from the sides, top, or bottom). Once the propulsion wheels have reached a target velocity, they may be made to contract toward one another, causing the propulsion wheels to converge on the projectile in the holding area. Once the propulsion wheels reach and engage the projectile, the propulsion wheels will transfer rotary inertia to a linear force used to propel the projectile.

A servo-actuated over-center linkage and spring-loaded flywheel arms may provide a near instantaneous transfer of the flywheel energy to the projectile. This may be accomplished by using a slotted servo actuating arm that will pull the over-center links past their resting over-center position and the slot in the servo arm will allow the flywheels to quickly contact the sides of the projectile. In this way, rotary inertia from the flywheels may be converted into a linear force that propels the projectile. A cam on the servo arm may control the power to the flywheel motors.

Rather than use a separate radio, the light control that already exists on the UAV may be used to control the projectile launching system in some embodiments. Turning on an existing light of the UAV may trigger movement of the flywheels and also turn on the motor that fires-up the flywheels. Similarly, turning off the light can bring together the flywheels and turn off the motor. This is a binary system, but alternative systems could have separate or different timing. Fine-tune the velocity and timing. An encoder or rpm sensor on the flywheels can be used to verify the range of particular projectiles and payload, to optimize the interface.

In some embodiments, two states may be available from a single binary control trigger, such as a light sensitive resistor (e.g., a photo diode), that may be used to trigger a servo controller. In this way, turning on or turning off a light of the UAV may provide two control states for the projectile launching system. A first state, which may correspond to turning the light on, causes the support arms that support the flywheels to move away from one another or stay spaced away from one another, thus separating the flywheels or keeping them separated at an open position. In the open position, the flywheels should be spaced far enough apart to avoid contact with a projectile loaded between the flywheels. In addition, the first state may cause the motors driving the flywheels to rotate. In this way, turning the light on imparts rotation to the flywheels. A second state, which may correspond to turning the light off, causes the support arms that support the flywheels to move toward one another, bringing the flywheels toward one another as well. In addition, the second state may power off the motors driving the flywheels to rotate. A projectile may be loaded into position for launch between the flywheels when the flywheels are in the first state. A pilot may fly the UAV into position (e.g., over cattle diagnosed as being sick) and turn on the light, which may trigger the AFD to start spinning the flywheels. The pilot will then have the ability to aim as the flywheels spin up. When the pilot is ready to launch the projectile, the pilot may shut off the light and the AFD will return to the first state, but the rotating flywheels will converge on the projectile until they make contact with the sides of the projectile, thus converting the rotary inertia into a linear force that propels the projectile.

As used herein, the term "flywheel" refers to a mechanical device that uses the conservation of angular momentum to store rotational energy; a form of kinetic energy proportional to the product of its moment of inertia and the square of its rotational speed. The flywheel may include a relatively heavy wheel that is configured to oppose and moderate by its inertia any fluctuation of speed imparted by a motor.

As used herein, the term "UAV" refers to one of various types of unmanned aerial vehicles. A UAV may include an onboard computing device configured to fly and/or operate the UAV without remote operating instructions (i.e., autonomously), and/or with some remote operating instructions or updates to instructions stored in a memory, such as from a human operator or remote computing device (i.e., semi-autonomously). UAVs may be propelled for flight in any of a number of known ways. For example, a plurality of propulsion units, each including one or more rotors, may provide propulsion or lifting forces for the UAV and any payload carried by the UAV. In addition, UAVs may include wheels, tank-treads, or other non-aerial movement mechanisms to enable movement on the ground, on or in water, and combinations thereof. The UAV may be powered by one or more types of power source, such as electrical, chemical, electro-chemical, or other power reserve, which may power the propulsion units, the onboard computing device, and/or other onboard components.

The term "computing device" is used herein to refer to an electronic device equipped with at least one processor. Examples of computing devices may include a UAV flight control and/or mission management computer that is onboard the UAV, as well as remote computing devices communicating with the UAV configured to perform operations of the various embodiments. Remote computing devices may include wireless communication devices (e.g., cellular telephones, wearable devices, smart-phones, web-pads, tablet computers, Internet enabled cellular telephones, Wi-Fi® enabled electronic devices, personal data assistants (PDA's), laptop computers, etc.), personal computers, and servers. In various embodiments, computing devices may be configured with memory and/or storage as well as wireless communication capabilities, such as network transceiver(s) and antenna(s) configured to establish a wide area network (WAN) connection (e.g., a cellular network connection, etc.) and/or a local area network (LAN) connection (e.g., a wireless connection to the Internet via a Wi-Fi® router, etc.).

FIGS. 1A-1G illustrate an actuated projectile launcher 100 in different stages of a cycle of loading and launching a projectile 90 in accordance with various embodiments. The actuated projectile launcher 100 is a dual-wheel projectile launcher suitable for use with various embodiments. The actuated projectile launcher 100 includes a base structure 110, which may support various elements thereof, including a projectile support 120, two propulsion wheels 131, and two support arms 151.

The base structure 110 may be part of a frame, casing, or other structure configured to serve as a foundation for supporting the various elements of the actuated projectile launcher 100.

The projectile support 120 may be any element that holds the projectile 90 in a loaded position in the holding area ready to be fired, until the propulsion wheels 131 come together to expel the projectile 90 from the holding area. The projectile support 120 may be a bracket that is part of or fixed to the base structure 110. Alternatively, the projectile support 120 may be part of a casing of the projectile, a magazine, a clip holding multiple projectiles 90, or other loading assembly for feeding the projectiles 90 individually into the holding area from which the projectile 90 gets launched. The holding area may be an enclosed chamber, a partially enclosed chamber, or an open area that lies between the propulsion wheels 131 and other related structures of the actuated projectile launcher 100.

The projectile 90 may be a dart for delivering medical treatment, a tracking device, ammunition, an explosive, or other payload, capturing a biopsy specimen, marking things, and more. The projectile 90 may be made from low cost materials and a simple, easy to manufacture shape (e.g., cylindrical) since the propulsion wheels can include compliant surfaces configured to grip the projectile. For example, the projectile may be a 3-D printed biodegradable and/or water-soluble dart (e.g., polyethylene glycol). This is particularly useful when shot into a field with cattle that may tend to eat such projectiles if given the opportunity. The projectile 90 may include wings or other lift surfaces. Projectiles 90 used as cattle marking darts may have an oversized open cell foam head to create a larger mark that may be clearly visible from a distance. Also, the open celled foam head may be configured to hold powder or a liquid marking medium. Such projectiles 90 may apply a temporary non-toxic marking medium to creatures, such as cattle. Also, the markings left by such projectiles 90 may enable handlers to visually identify and separate cattle for treatment or as needed.

In FIGS. 1A-1G, the projectile 90 is configured to be loaded into the holding area from a bottom of the actuated projectile launcher 100. Alternatively, the projectile 90 may be loaded from the front. The bottom-loading configuration may enable a magazine of projectiles 90 to feed another projectile 90 into the holding area after a projectile 90 is launched.

The two propulsion wheels 131 may be selectively driven to rotate opposite one another by separate motors 121. The propulsion wheels 131 are configured to engage the projectile 90 from opposite sides, so the opposite rotation ensures that engagement pushes the projectile 90 in the same direction. The propulsion wheels 131 may be formed with compliant outer surfaces, such as a high-friction surface like neoprene or other rubbery gription material with rugged texture and durable material. The two propulsion wheels 131 may be flywheels configured to store rotational energy and translate that rotational energy into a linear force for propelling the projectile 90. As flywheels, each motor 121 may spin its corresponding propulsion wheel 131 until it reaches full rotational velocity, or some other target rotational velocity. In response to the flywheels (i.e., the propulsion wheels 131) reaching that target rotational velocity, the motors 121 may be turned off and an actuator can quickly move the support arms 151 and the propulsion wheels 131 toward one another to engage the projectile 90 therebetween. Alternatively, as described below, the timing of the shut off of the motors 121, relative to when the support arms 151 are moved to the contracted position, may be adjusted as needed (e.g., before or after engagement of the propulsion wheels 131 with the projectile 90).

Various factors may be considered in attempting to optimize the transfer of rotational energy from the propulsion wheels 131 to the projectile 90. Attempts to increase the projectile acceleration (e.g., by including a rack and pinion design) may cause the system to lose energy, depending on the relative inertia of the two bodies. Increasing wheel inertia, decreasing wheel contact radius, or decreasing projectile mass may reduce this loss.

Decreasing the flywheel radius may reduce collision loss (i.e., energy losses as the flywheels and the projectile engage one another), but then motor speeds may need to be increased. A larger radius flywheel may be able to handle more deceleration during the collision, but too large a radius and the collision loss may dominate over energy transfer to the projectile. Thus, an optimal radius may be designed for a particular size projectile or even an average size projectile. In accordance with various embodiments, it may be advantageous to impart as much inertia as is available to the flywheel before contact with the projectile. Increasing flywheel inertia by a factor of 8 may support a contact radius that is 2.5 times larger and may impart about 2.5 times more speed to the projectile as well. Another consideration may be the mass of the projectile. Too low a projectile mass may cause drag to be problematic for accuracy in projectile trajectory. Optionally, the flywheel may include a larger radius beyond that of the projectile contact surface in order to store greater inertial energy.

Some embodiments may use a closed form equation for predicting projectile velocity as follows:

$$V_D = W_0 * R / (1 + M_P * R^2 / I_W / N_W) \quad (1).$$

In equation (1), above:
$V_D$ is the dart velocity in m/s,
$W_0$ is the initial flywheel velocity in rad/s,
R is the flywheel radius in meters,
$M_P$ is the projectile mass in kg,
$I_W$ is the flywheel inertia in kg-m², and
$N_W$ is the number of flywheels.
Equation (1) assumes that motor forces (e.g., cogging, drag, active torque, etc.) are all negligible, which may be reasonable based on the energies involved and duration of contact. Also, Equation (1) assumes that non-slip conditions are achieved between the projectile and the flywheels (i.e., there is sufficient friction between contact surfaces).

The support arms 151 may each support one of the propulsion wheels 131. A first end of each support arm 151 may hold one of the propulsion wheels 131 and an opposed second end thereof may be pivotally secured to the base structure 110. A support arm pivot point 153 at the second end of the support arm 151 may be any type of pivotal coupling. The support arms 151 are configured to move the two propulsion wheels 131 between an expanded position and a contracted position through a pivotal movement. In addition, the support arms 151 may be biased toward the contracted position using one or more biasing springs. For example, each of the support arm pivot points 153 may be spring-loaded to encourage the support arms 151 toward the contracted position. Alternatively, or additionally, a spring may extend between and connect the first ends of both support arms 151 to provide a biasing force that pulls the support arms 151 toward one another. In the expanded position, the propulsion wheels 131 may be as far apart or almost as far apart as they can get. In contrast, the propulsion wheels 131 are closer to one another in the contracted position as compared to the expanded position. The movement of the propulsion wheels 131 toward the contracted position is configured to bring the two propulsion wheels 131 into engagement with the projectile 90 and drive the projectile 90 from the holding area of the actuated projectile launcher 100.

In some embodiments, the coupling between the support arms 151 and the propulsion wheels 131 may have a spring or similar resilient element to soften the impact between the propulsion wheels 131 and the projectile 90. Also, such a resilient element may bias the support arms 151 toward the contracted position, which may help get the propulsion wheels 131 to engage the projectile 90 as quickly as possible.

The actuated projectile launcher 100 may include an over-center linkage configured to guide at least one of the two support arms 151 between the expanded position and the contracted position. An over-center linkage uses multiple rigid bars or links connected by joints to constrain motion between the links and of the overall linkage. In various embodiments, the over-center linkage may include at least one pivotal joint with a slide mechanism that is unstable at a central position of the slide path. This unstable central position encourages a guidepost 145, used as a pivot point, to slide to one side or the other of that central position. In this way, the guidepost 145 may have so-called "resting positions" to either side of the central position.

In particular, the over-center linkage may be a group of elements that include separate over-center links 141 for each of the support arms 151, a slotted servo actuating guide 125, and the guidepost 145. Each of the over-center links 141 may be pivotally coupled at a first end 143 to a different one of the support arms 151. Also, each of the over-center links 141 may be pivotally coupled at a second end to the base structure or an element that serves as an extension of the base structure (i.e., fixedly secured thereto). For example, the second end of the over-center links 141 may be pivotally coupled to the slotted servo actuating guide 125, which extends from the base structure 110. Alternatively, the slotted servo actuating guide 125 may be incorporated into the base structure 110. The pivotal coupling of the over-center link 141 with the slotted servo actuating guide 125 may be through an elongate slot 127 formed in the slotted servo actuating guide 125. The elongate slot 127 enables the second end of the over-center link 141 to slide linearly along a segment of the slotted servo actuating guide 125 while maintaining the pivotal coupling to the base structure 110. A guidepost 145 pivotally secured to the second ends of the over-center links 141 may be configured to slide along the elongate slot 127. The elongate slot 127 functions like a track that guides the movement of the guidepost 145, which in-turn moves the second ends of the over-center links 141. Alternatively, a different form of track may be used to enable a linear movement of the guidepost 145, while maintaining a pivotal coupling between the over-center links 141 and the slotted servo actuating guide 125. In the actuated projectile launcher 100, the second end of both of the over-center links 141 are secured to the same guidepost 145. In this way, pivotal movement of the two over-center links 141 is guided by the same guidepost 145.

The actuated projectile launcher 100 may additionally include an actuator 170 configured to move to the guidepost 145, along with the second ends of the over-center links 141, between a first position and a second position. The actuator 170 may be a servo motor configured to pivot an actuator arm 175 that controls the sliding movement of the guidepost 145 using a trigger bar 161. Movement of the guidepost 145 by the actuator 170 into the first position also moves the propulsion wheels 131 into the expanded position. Similarly, movement by the actuator 170 of the guidepost 145 into the second position moves the propulsion wheels 131 into the contracted position. Before reaching the fully contracted position (i.e., the closest support arms 151 may allow the propulsion wheels 131 to get to one another), the propulsion wheels 131 may engage and propel the projectile 90 if loaded in the holding area.

In FIG. 1A, the guidepost 145 is illustrated as being disposed in the first position, which corresponds to a rear-most position in the elongate slot 127. In the orientation shown in FIGS. 1A-1G, a right side of the actuated projectile launcher 100 is referred to as the rear and the left side is referred to as the front, which faces forward. The front faces the direction in which the projectiles are launched. In contrast, a second position of the guidepost 145 (see FIG. 1D) may correspond to the forward-most position within the elongate slot 127.

In various embodiments, the trigger bar 161 may extend through a passage or slot that extends through the guidepost 145, which allows the trigger bar 161 to slide relative to the guidepost 145. This sliding engagement of the trigger bar 161 and the guidepost 145 may be limited by a proximal trigger block 163 and a distal trigger block 165 both fixedly secured to the trigger bar 161 on opposite sides of the guidepost 145. A spacing between the proximal trigger block 163 and the distal trigger block 165 may be configured to limit a linear extend of the movement of the guidepost along the trigger bar 161. The spacing of the trigger blocks 163, 165 means that the movement of the guidepost 145 is loosely controlled by the trigger bar 161. For example, as the actuator 170 and actuator arm 175 move the trigger bar 161 forward, the guidepost 145 will not start moving forward until the proximal trigger block 163 engages the guidepost 145. Similarly, as the actuator 170 and actuator arm 175 move the trigger bar 161 rearward, the guidepost 145 will not start moving rearward until the distal trigger block 165 engages the guidepost 145. As a result of the biasing spring(s) that encourage the support arms 151 toward the contracted position, the loose guided movement of the guidepost 145 by the trigger bar 161 may enable a quick snapping movement of the guidepost 145 as the trigger blocks 163, 165 push the guidepost 145 through an over-center position. The over-center position may correspond to when the over-center links 141 are perpendicular to the elongate slot 127. At or beyond the over-center position, the force from the biasing springs may take over and start pulling the support arms 151 toward the contracted position, as well as pulling the second end of the over-center links 141 and the guidepost 145 forward. For example, as the proximal trigger block 163 pushes the guidepost 145 toward the second (i.e., forward) position, when the guidepost 145 reaches the over-center position, the guidepost 145 may accelerate, moving faster than the trigger bar 161, to rest in the second position. Similarly, as the distal trigger block 165 pushes the guidepost 145 toward the first (i.e., rear) position, when the guidepost 145 reaches the over-center position, the guidepost 145 may accelerate, moving faster than the trigger bar 161, to rest in the first position.

Various embodiments use an off-center latch mechanism, which provides a quick engagement between the flywheels and the projectile. The off-center design promotes a high-speed snap movement of the two support arms. Otherwise, a slow engagement by the flywheels with the projectile will encourage slip, which is less efficient. Also, if the engagement between the flywheels and the projectile is too fast, this may cause a bounce between engagement surfaces, which is also inefficient. The flywheels may be spring-mounted for absorbing some of the shock of a quick engagement. Considerations may include the weight of the flywheels and the projectile, the materials used, the size of the projectile (e.g., length and/or diameter).

FIG. 1A particularly illustrates the actuated projectile launcher 100 with the propulsion wheels 131 in an expanded position and the projectile 90 loaded in the holding area. With the propulsion wheels 131 in the expanded position, the propulsion wheels 131 will not contact or otherwise engage the projectile 90. As shown, the guidepost 145 is disposed at the rear end of the elongate slot 127 and the over-center links 141 extend laterally from the slotted servo actuating guide 125 and are angled slightly forward. Any spring configured to bias the support arms 151 toward the contracted position will be under load.

Figure 1B:
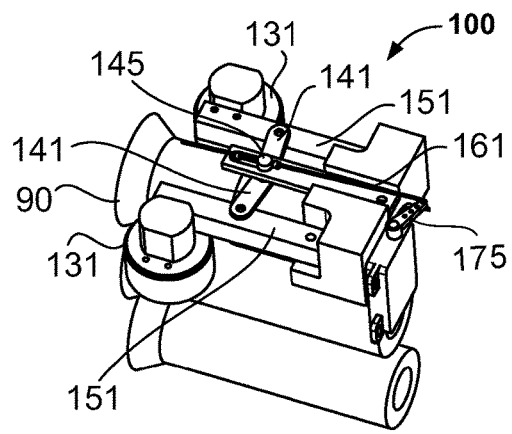

FIG. 1B particularly illustrates the actuated projectile launcher 100 just after the actuator (e.g., 170) has been activated and started moving the trigger bar 161 forward. In particular, the servo actuator arm 175 rotated counter-clockwise a little and the trigger bar 161 moved a little forward, such that the proximal trigger block 163 has moved into engagement with the guidepost 145.

Figure 1C:
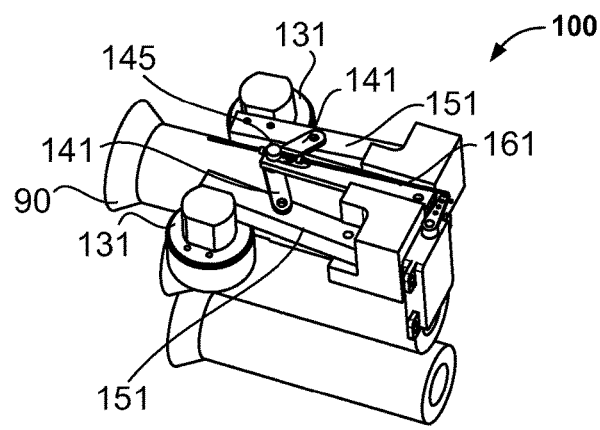

FIG. 1C particularly illustrates the actuated projectile launcher 100 just after the guidepost 145 has pushed the over-center links 141 to the over-center position and is disposed at the forward end of the elongate slot (e.g., 127) and to the proximal trigger block 163. The movement of the guidepost 145 all the forward has caused the over-center links 141 to allow the spring 152 to pull the support arms 151 toward one another, which also means that the propulsion wheels 131 are in the contracted position and made to engage the projectile 90. At this stage, the propulsion wheels 131 are transferring their rotational energy into the projectile 90 for propelling the projectile 90 from the holding area.

Figure 1D:
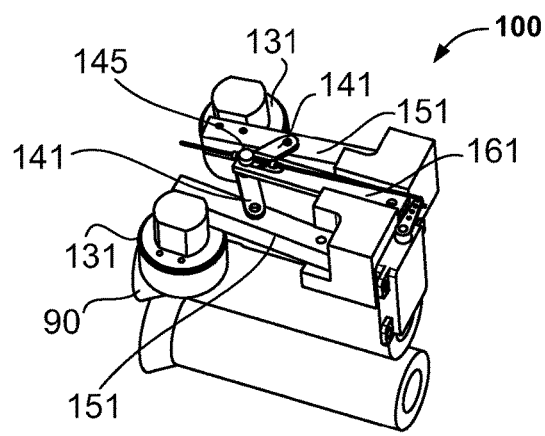

FIG. 1D particularly illustrates the actuated projectile launcher 100 at a stage in which the projectile 90 that was previously in the holding area has now been launched, such that the holing area is empty. However, at this stage the holding area is not ready to receive another projectile 90 because the propulsion wheels 131 are still in the contracted position.

Figure 1E:
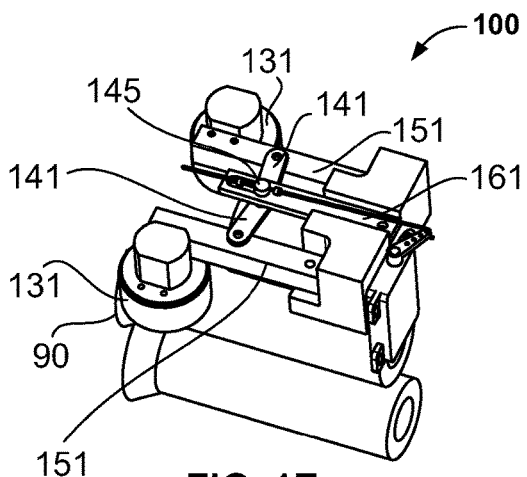

FIG. 1E particularly illustrates the actuated projectile launcher 100 at a stage in which the actuator (e.g., 170) moved the trigger bar 161 rearward. In particular, the servo actuator arm (e.g., 175) has rotated clock-wise a little and the trigger bar 161 moved a little rearward, such that the distal trigger block (e.g., 165) moved into engagement with the guidepost 145 and pushed the guidepost 145 over-center to the rearmost position of the elongate slot (e.g., 127). The movement of the guidepost 145 all the rearward has caused the over-center links 141 to push the support arms 151 away from one another, increasing the load provided by the biasing spring(s) that encourage(s) the support arms 151 toward the contracted position, which also means that the propulsion wheels 131 are in the expanded position. It should be noted that just prior to this stage, although the trigger bar 161 and the distal trigger block were pushing the guidepost rearward, after reaching the over-center position the guidepost 145 accelerated in the rearward direction faster than the trigger bar 161 and the distal trigger block. This is why the guidepost 145 is shown separated from the guidepost at this stage.

Figure 1F:
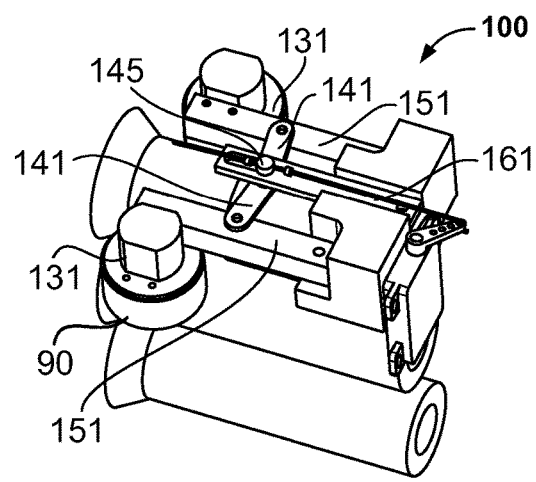

FIG. 1F particularly illustrates the actuated projectile launcher 100 at a stage in which the actuator (e.g., 170) moved the trigger bar 161 to the rearmost position. In particular, the servo actuator arm (e.g., 175) has rotated further clock-wise and the trigger bar 161 moved a little further rearward, catching up with the guidepost 145 at the rearmost position of the elongate slot 127.

Figure 1G:
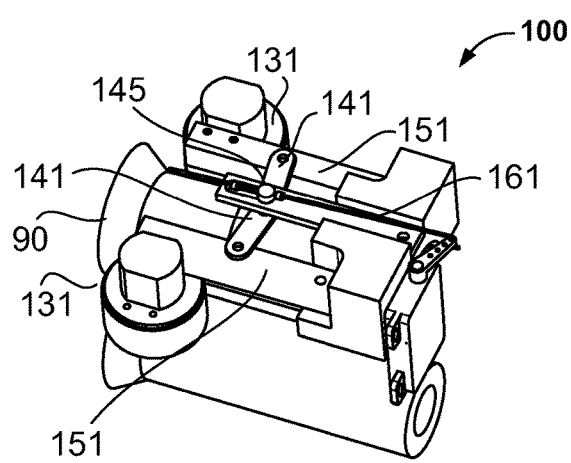

FIG. 1G particularly illustrates the actuated projectile launcher 100 with the propulsion wheels 131 back in the expanded position and the next projectile 90 loaded in the holding area. In the expanded position, the propulsion wheels 131 can be spun without them engaging the newly loaded projectile 90.

The stages illustrated in FIGS. 1A-1G may be repeated as long as there's a projectile 90 available to launch.

With regard to a launch sequence, the flywheels may be driven up to a top speed and then be allowed to free-wheel just prior to engagement with the projectile. In some embodiments, the projectile may be completely launched (i.e., separated from the flywheels) with approximately two rotations of the flywheels following engagement therewith. In this way, the flywheels may impart their rotational momentum to the projectile for launch. Alternatively, the flywheels may continue to be driven through the engagement with the projectile. Various embodiments may adjust the timing of when the motor shuts off relative to when the flywheels are moved into the contracted position for launching the projectile. Adjusting this timing may ensure a desired exit velocity of the projectile. All this may be dependent upon the coefficients of friction of the flywheel surface and the corresponding surface on the projectile that gets gripped. One consideration is that the flywheel velocity, at the point during launch when the projectile is no longer engaged by the flywheel, should match the projectile maximum velocity. Otherwise, if the flywheel starts slowing down before it separates from the projectile, the flywheel will slow down the projectile. The amount of rotational energy transferred may be controlled to avoid imparting drag on the projectile.

Figure 2A:
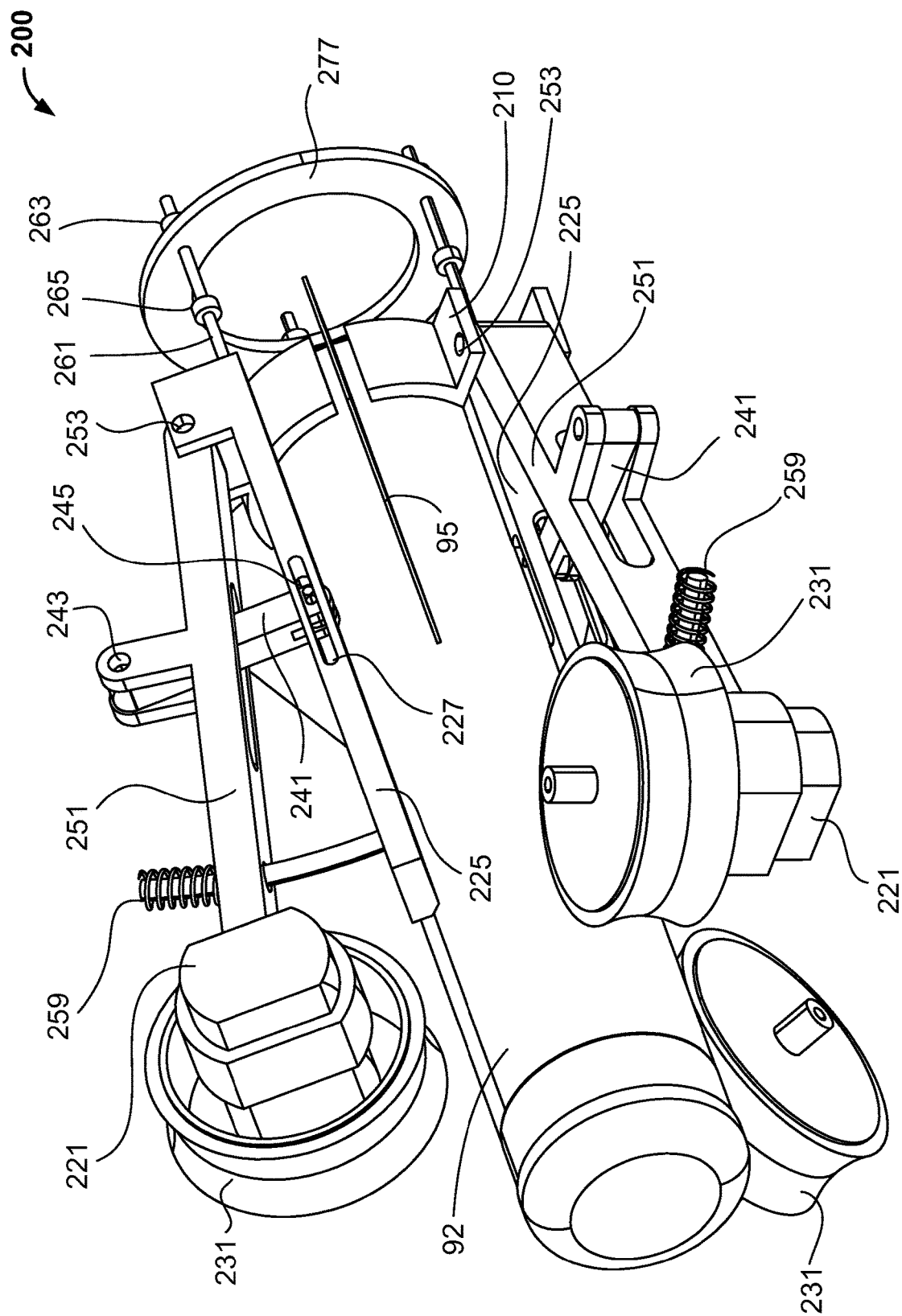
Figure 2B:
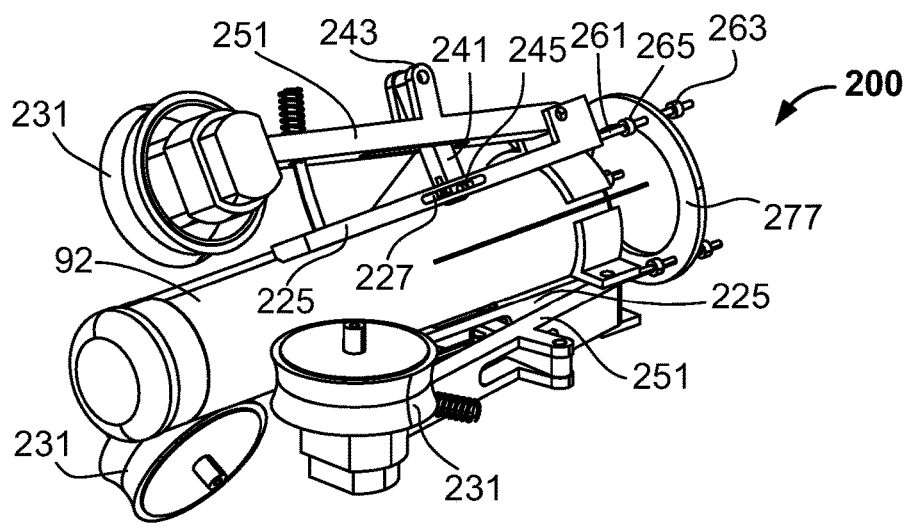

FIGS. 2A-2B illustrate another actuated projectile launcher 200 in different stages of a cycle of loading and launching a finned projectile 92 in accordance with various embodiments. The actuated projectile launcher 200 is a tri-wheel projectile launcher suitable for use with various embodiments. The actuated projectile launcher 200 may include many of the elements and features described above with regard to the actuated projectile launcher (e.g., 100) described with regard to FIGS. 1A-1G. Elements of the tri-wheel projectile launcher that are different from the dual-wheel projectile launcher are described in further detail here.

The actuated projectile launcher 200 includes a base structure 210, which may support various elements thereof, including portions thereof that form a projectile support. The base structure 210 may also support three pivoting support arms 251 and three propulsion wheels 231. Each of the three propulsion wheels 231 is secured to a separate one of the three pivoting support arms 251. The three pivoting support arms 251 share a mechanical linkage configured to move all three pivoting support arms 251 in unison.

The actuated projectile launcher 200, which is a tri-wheel projectile launcher, is particularly suited to finned projectiles 92 since the spacing of the propulsion wheels will not interfere with the position of the fins 95. In fact, the projectile support elements of the base structure 210 may have cut-outs or gaps to accommodate the fins 95.

In FIGS. 2A-2H, the projectile 92 is configured to be loaded into the holding area from a bottom of the actuated projectile launcher 200. Alternatively, the projectile 92 may be loaded from the front. The bottom-loading configuration may enable a magazine of projectiles 92 to feed another projectile 92 into the holding area after the projectile 92 is launched.

The three propulsion wheels 231 may be selectively driven to rotate such that the sides of each of the propulsion wheels 231 that face the other propulsion wheels 231 rotate in the launch direction (i.e., toward the bottom left in the orientation shown in FIGS. 2A-2H). The three propulsion wheels 231 may each be driven by separate motors 221. The propulsion wheels 231 are configured to engage the projectile 92 from different sides, equally spaced around a circumference of the projectile 92.

The three propulsion wheels 231 may be flywheels configured to store rotational energy and translate that rotational energy into a linear force for propelling the projectile 92. In response to the flywheels (i.e., the propulsion wheels 231) reaching their target rotational velocity, which may be a maximum velocity, the motors 221 may be turned off and an actuator can quickly move the pivoting support arms 251 and the propulsion wheels 231 toward one another to engage the projectile 92 therebetween. Alternatively, as described below, the timing of the shut off of the motors 221, relative to when the pivoting support arms 251 are moved to the contracted position, may be adjusted as needed (e.g., before or after engagement of the propulsion wheels 231 with the projectile 90).

The pivoting support arms 251 may each support one of the propulsion wheels 231. A first end of each pivoting support arm 251 may hold one of the propulsion wheels 231 and an opposed second end thereof may by pivotally secured to the base structure 210. A support arm pivot point 253 at the second end of the pivoting support arm 251 may be any type of pivotal coupling. The pivoting support arms 251 are configured to move the three propulsion wheels 231 between an expanded position and a contracted position. In the expanded position, the propulsion wheels 231 may be as far apart or almost as far apart as they can get. In contrast, the propulsion wheels 231 are closer to one another in the contracted position as compared to the expanded position. The movement of the propulsion wheels 231 toward the contracted position is configured to bring the three propulsion wheels 231 into engagement with the projectile 92 and drive the projectile 92 from the holding area of the actuated projectile launcher 200.

The actuated projectile launcher 200 includes a spring 259 that biases the pivoting support arms 251 toward the slotted servo actuating arm 225 of the base structure 210. In this way, the pivoting support arms 251 may be biased toward the contracted position by the springs 259.

The actuated projectile launcher 200 may include over-center linkages configured to guide each of the three pivoting support arms 251 between the expanded position and the contracted position. In various embodiments, the over-center linkage may include at least one pivotal joint with a slide mechanism that is unstable at a central position of the slide path. This unstable central position encourages a guidepost 245, used as a pivot point, to slide to one side or the other of that central position. In this way, the guidepost 245 may have so-called "resting positions" to either side of the central position.

The over-center linkage may be a group of elements that include separate over-center links 241 for each of the pivoting support arms 251, a slotted servo actuating arm 225, and the guidepost 245. Each of the over-center links 241 may be pivotally coupled at a first end 243 to a different one of the support arms 251. Also, each of the over-center links 241 may be pivotally coupled at a second end to the base structure or an element that serves as an extension of the base structure (i.e., fixedly secured thereto). For example, the second end of the over-center links 241 may be pivotally coupled to the slotted servo actuating arm 225, which extends from the base structure 210. Alternatively, the slotted servo actuating arm 225 may be incorporated into the base structure 210. The pivotal coupling of the over-center link 241 with the slotted servo actuating arm 225 may be through an elongate slot 227 formed in the slotted servo actuating arm 225. The elongate slot 227 enables the second end of the over-center link 241 to slide linearly along a segment of the slotted servo actuating arm 225 while maintaining the pivotal coupling to the base structure 210. The guidepost 245 pivotally secured to the second ends of the over-center links 241 may be configured to slide along the elongate slot 227. The elongate slot 227 functions like a track that guides the movement of the guidepost 245, which in-turn moves the second ends of the over-center links 241. Alternatively, a different form of track may be used to enable a linear movement of the guidepost 245, while maintaining a pivotal coupling between the over-center links 241 and the slotted servo actuating arm 225. In the actuated projectile launcher 200, the second end of each of the over-center links 241 is secured to different guidepost 245 associated with different over-center links 241. In this way, no two over-center links 241 share the same guidepost 245.

The actuated projectile launcher 200 may include an actuator similar to the actuator (e.g., 170) described with regard to FIGS. 1A-1G but may use a trigger ring 277 to distribute an actuator push/pull force around a three-dimensional space that surrounds the projectile holding area. Thus, the trigger ring 277 may be configured to move axially along an axis coincident with a central axis of the projectile 92. The trigger ring 277 may be configured to move three separate trigger bars 261 each linked to a separate guidepost 245. Movement of the guideposts 245 moves the second ends of the over-center links 241, between a first position and a second position. Movement of the guidepost 245 by the actuator into the first position also moves the propulsion wheels 231 into the expanded position. Similarly, movement by the actuator of the guidepost 245 into the second position moves the propulsion wheels 231 into the contracted position. Before reaching the fully contracted position (i.e., the closest pivoting support arms 251 may allow the propulsion wheels 231 to get to one another), the propulsion wheels 231 may engage and propel the projectile 92 if loaded in the holding area.

In FIG. 2A, the guidepost 245 is illustrated as being disposed in the first position, which corresponds to a rear-most position in the elongate slot 227. In the orientation shown in FIGS. 2A-2H, a right side of the actuated projectile launcher 200 is referred to as the rear and the left side is referred to as the front, which faces forward. The front faces the direction in which the projectiles are launched. In contrast, a second position of the guidepost 245 (see FIG. 2E) may correspond to the forward-most position within the elongate slot 227.

The trigger ring 277 may be in sliding engagement with the separate trigger bars 261. In particular, the trigger ring 277 may include three separate small apertures equally spaced around and extending through the circular band that forms the trigger ring 277. Each of the trigger bars 261 corresponds to and extends through a different one of the small apertures, to allow the trigger ring 277 to slide along the three trigger bars 261 at once. Each of the separate trigger bars 261 may include a pair of trigger blocks 263, 265 fixed thereto and disposed on opposed sides of the trigger ring 277 and thus limiting a linear extend of movement of the trigger ring 277 along the separate trigger bars 261. A spacing between the proximal trigger block 263 and the distal trigger block 265 may be configured to limit a linear extend of the movement of the trigger ring 277 along the trigger bars 261. The spacing of the trigger blocks 263, 265 means that the movement of the trigger bars 261 is loosely controlled by the movement of the trigger ring 277. For example, as the actuator moves the trigger ring 277 forward, the trigger bars 261 will not start moving forward until the trigger ring 277 engages the distal trigger block 265. Similarly, as the actuator moves the trigger ring 277 rearward, the trigger bars 261 will not start moving rearward until the trigger ring 277 engages the proximal trigger block 263. As a result of the springs 259 that encourage the support arms 251 toward the contracted position, the loose guided movement of the trigger bars 261 by the trigger ring 277 may enable a quick snapping movement of the guideposts 245 as the trigger ring 277 pushes the guideposts 245 through an over-center position. The over-center position may correspond to when the over-center links 241 are perpendicular to their respective elongate slots 227. At or beyond the over-center position, the force from the springs 259 may take over and start pulling the support arms 251 toward the contracted position, as well as pivoting the over-center links 241 and the guidepost 245 forward. For example, as the trigger ring 277 pushes the distal trigger block 265 toward the second (i.e., forward) position, when the guidepost 245 reaches the over-center position the guideposts 245 may accelerate, moving faster than the trigger bars 261, to rest in the second position. Similarly, as the trigger ring 277 pushes the proximal trigger block 263 toward the first (i.e., rear) position, when the guidepost 245 reaches the over-center position the guidepost 245 may accelerate, moving faster than the trigger bars 261, to rest in the first position.

FIG. 2A particularly illustrates the actuated projectile launcher 200 with the propulsion wheels 231 in an expanded position and the projectile 92 loaded in the holding area. With the propulsion wheels 231 in the expanded position, the propulsion wheels 231 will not contact or otherwise engage the projectile 92. As shown, the guidepost 245 is disposed at the rear end of the elongate slot 227 and the over-center links 241 extend radially outwardly from the slotted servo actuating arm 225 and are angled slightly forward.

FIG. 2B particularly illustrates the actuated projectile launcher 200 just after the actuator has been activated and started moving the trigger ring 277 forward. In particular, the trigger ring 277 moved a little forward, such that the trigger ring 277 has almost reached and engaged the distal trigger block 265.

Figure 2C:
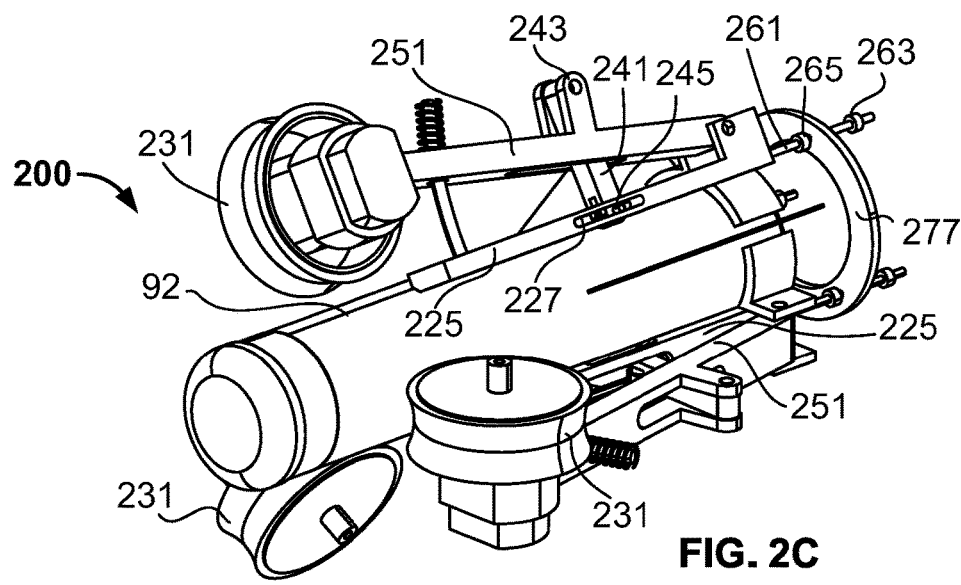

FIG. 2C particularly illustrates the actuated projectile launcher 200 just at the stage in which the trigger ring 277 has moved further forward and now engaging the distal trigger block 265, which means further movement forward by the trigger ring 277 will also move the trigger bars 261.

Figure 2D:
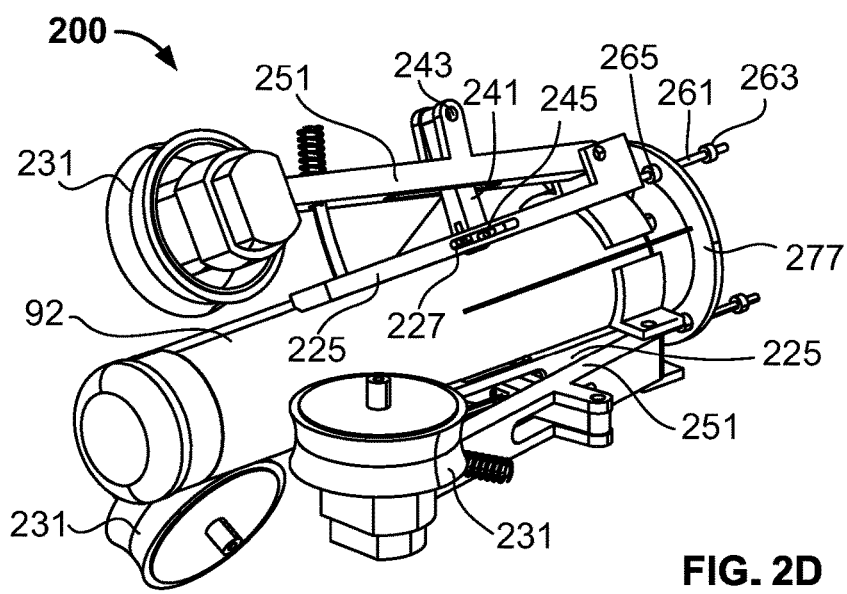

FIG. 2D particularly illustrates the actuated projectile launcher 200 at the point in which the guideposts 245 are at the over-center position. Further forward movement by the trigger ring 277 will snap the guideposts 245 and the corresponding over-center links 241 forward toward the front end of the elongate slot 227.

FIG. 2E particularly illustrates the actuated projectile launcher 200 at the point in which the guideposts 245 have moved forward, causing the over-center links 241 to pull the pivoting support arms 251 toward one another, which also means that the propulsion wheels 231 are in the contracted position and made to engage the projectile 92. At this stage, the propulsion wheels 231 are transferring their rotational energy into the projectile 92 for propelling the projectile 92 from the holding area.

FIG. 2F particularly illustrates the actuated projectile launcher 200 at a stage in which the projectile 92 that was previously in the holding area has now been launched, such that the holding area is empty. However, at this stage, the holding area is not ready to receive another projectile 92 because the propulsion wheels 231 are still in the contracted position.

Figure 2G:
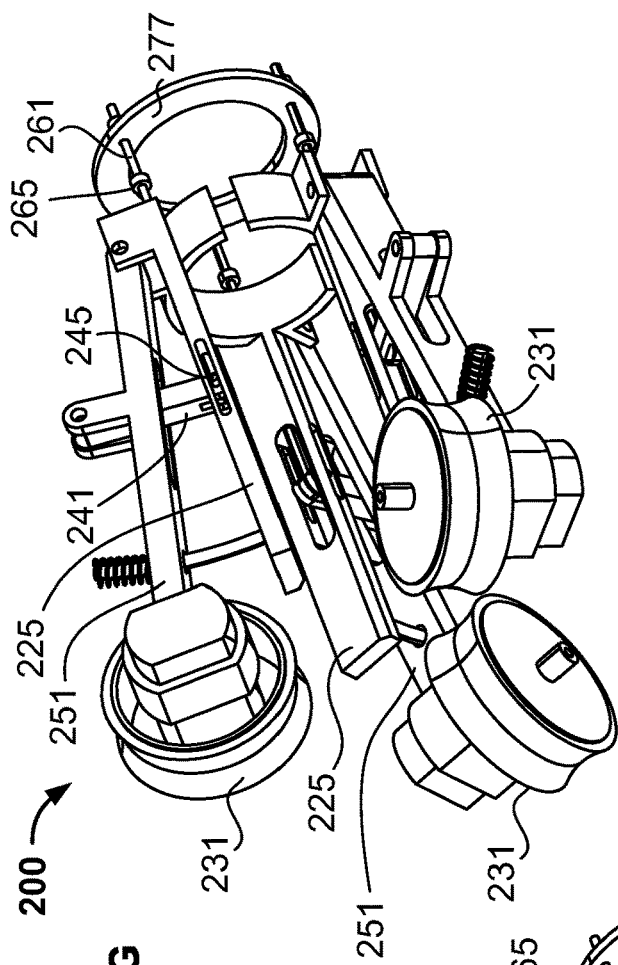

FIG. 2G particularly illustrates the actuated projectile launcher 200 at a stage in which the actuator moved the trigger ring 277 rearward. In particular, the trigger ring 277 moved rearward, such that the trigger ring 277 moved into engagement with the proximal trigger block 263 and started moving the trigger bars 261 rearward. The movement of the trigger bars 261 rearward has started to cause the over-center links 241 to push the pivoting support arms 251 away from one another. This movement also starts moving the propulsion wheels 231 away from the expanded position.

Figure 2H:
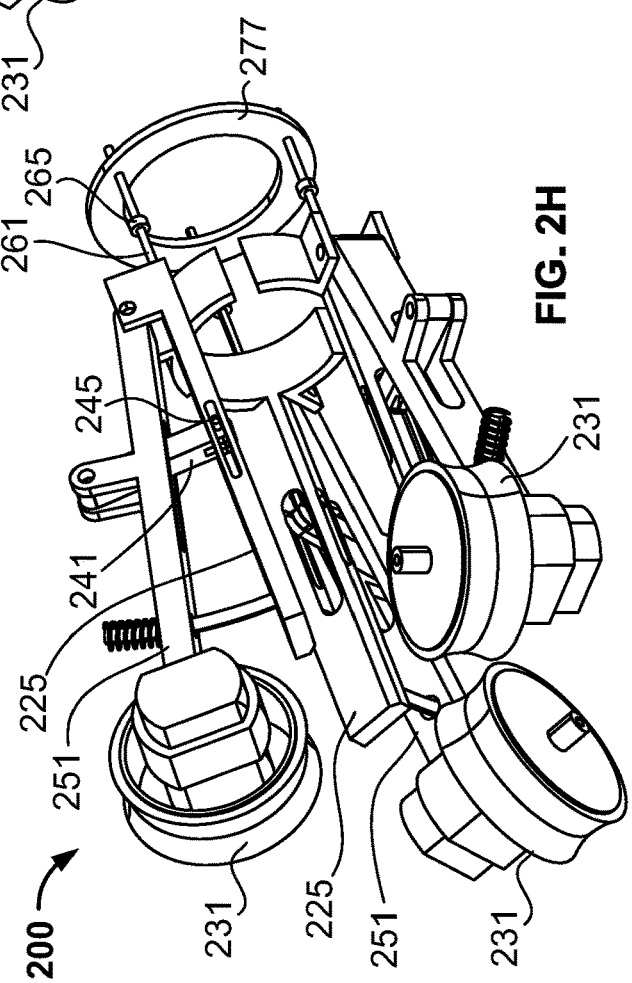

FIG. 2H particularly illustrates the actuated projectile launcher 200 at a stage in which the actuator moved the trigger ring 277 to the rearmost position, which caused the over-center links 241 to push the pivoting support arms 251 to pivot away from one another, which also means that the propulsion wheels 231 are in the expanded position. With the propulsion wheels 231 back in the expanded position, another projectile 92 may be loaded in the holding area. In the expanded position, the propulsion wheels 231 can be spun without them engaging the newly loaded projectile 92.

The stages illustrated in FIGS. 2A-2H may be repeated as long as there's a projectile 92 available to launch.

FIGS. 2I-2L illustrate the three-wheeled actuated projectile launcher 200, in various stages of launching a projectile with an actuating assembly 250 in accordance with various embodiments. The actuating assembly 250 may include an actuator 270, which may include a servo-motor or other actuating mechanism. The actuator 270 may rotate (e.g., through gearing) a guide-collar 251 with helical threads that may be configured to move axially as it rotates. The guide-collar 251 may in-turn be configured to move a trigger bracket 287. The trigger bracket 287 may move in conjunction with the trigger ring (e.g., 277), described above, along the trigger bars 261. Alternatively, the trigger bracket 287 may replace the trigger ring.

Figure 2J:
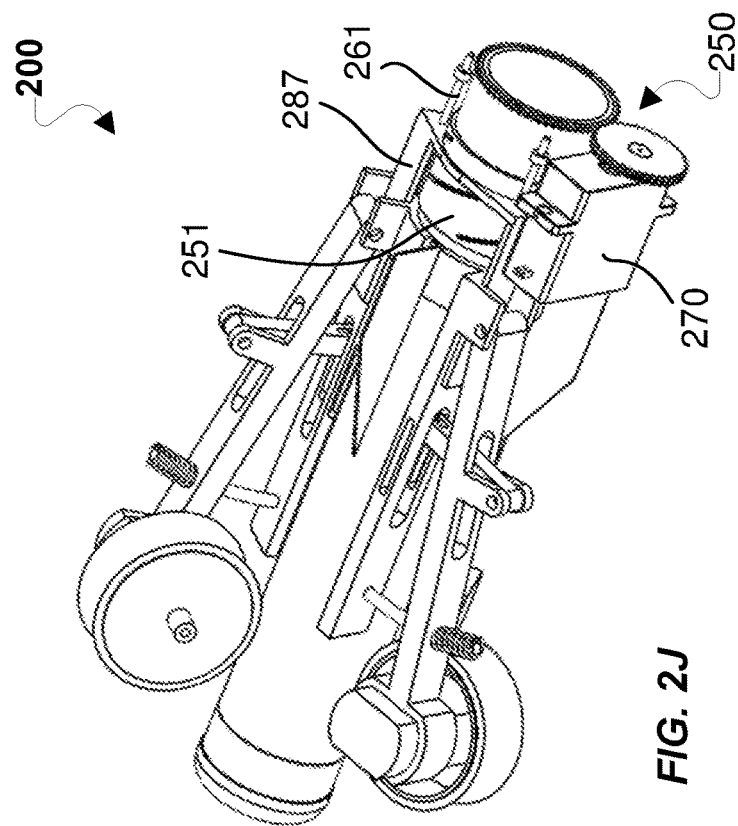
FIGS. 2I-2L are perspective views of the three-wheeled actuated projectile launcher of FIGS. 2A-2H including an actuating assembly in accordance with various embodiments.
Figure 2I:
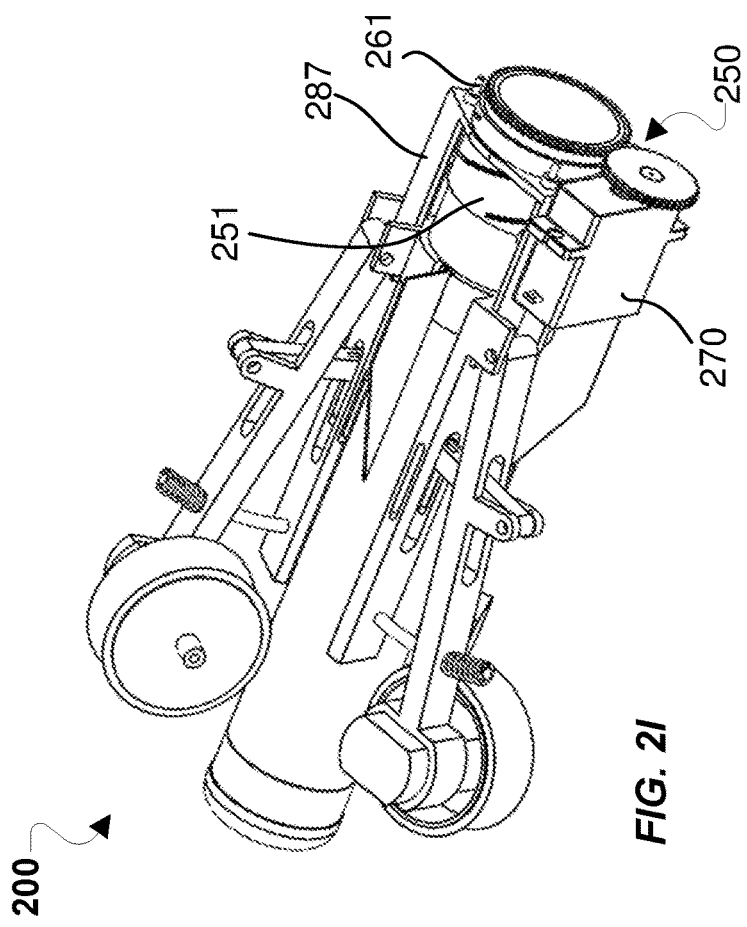
Figure 2L:
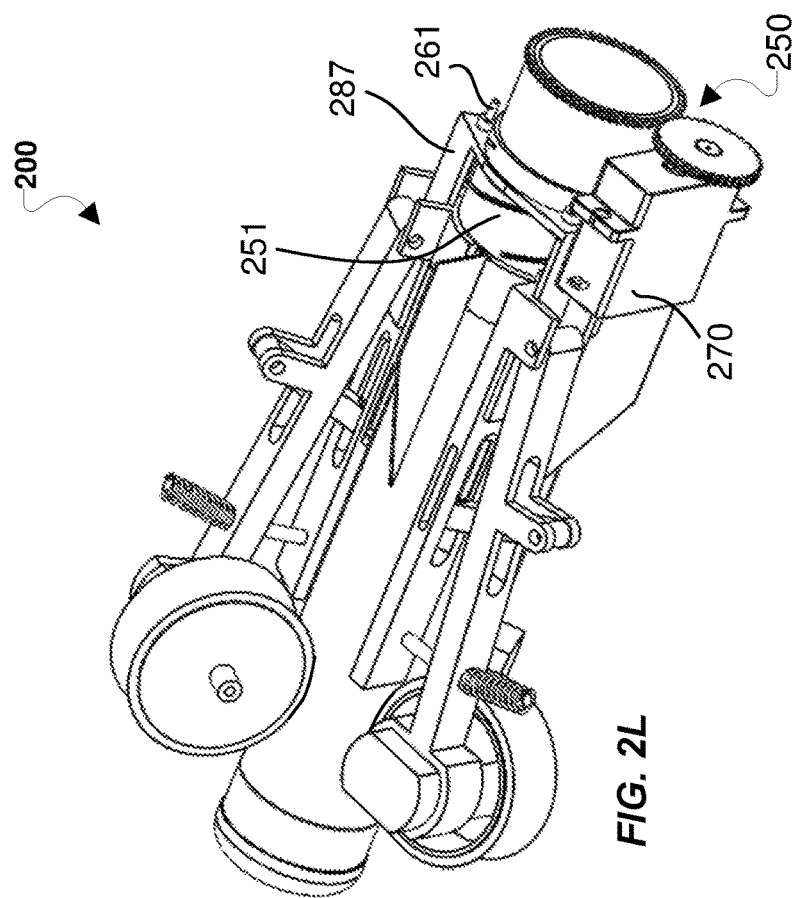
Figure 2K:
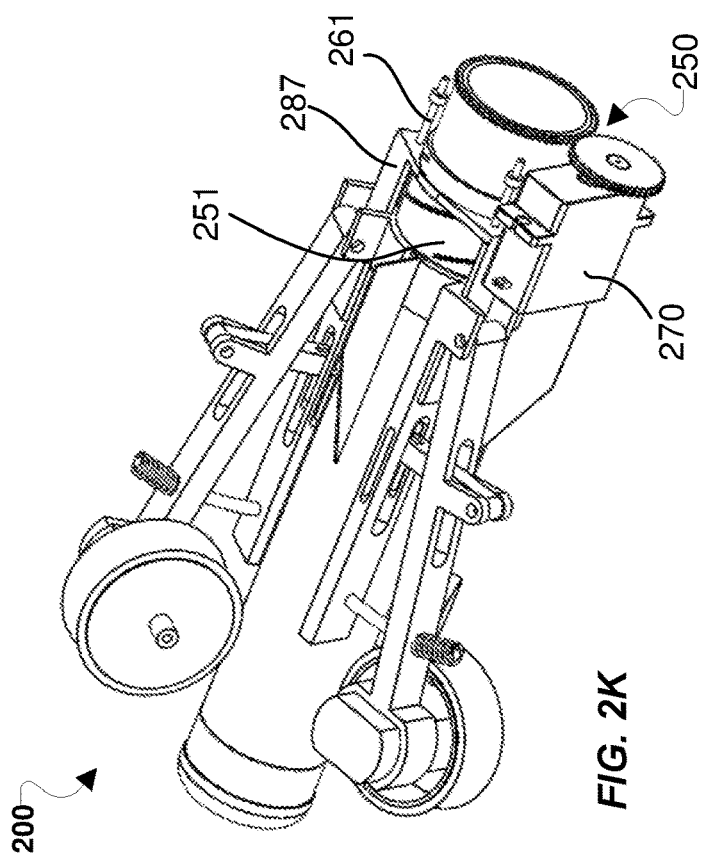

In FIG. 2I, the trigger bracket 287 is in a first position, which is a rear-most position relative to a direction of launch of the projectile. As the actuator 270 rotates the guide-collar 251, the trigger bracket 287 is made to slide forward. FIG. 2J shows the trigger bracket 287 in a more forward position, just prior to causing the over-center links (e.g., 241) to move. In FIG. 2K, the trigger bracket 287 has now caused the over-center links to move, but not yet past the over-center position. Once the over-center links move to or past the over-center position, they will snap forward as described above. In FIG. 2L, the trigger bracket 287 has now caused the over-center links to move past the over-center position, causing them to snap forward into a forward-most position. In the forward-most position the propulsion wheels (e.g., 231) are made to engage and propel the projectile (e.g., 90, 92, 94, 96).

Figure 2M:
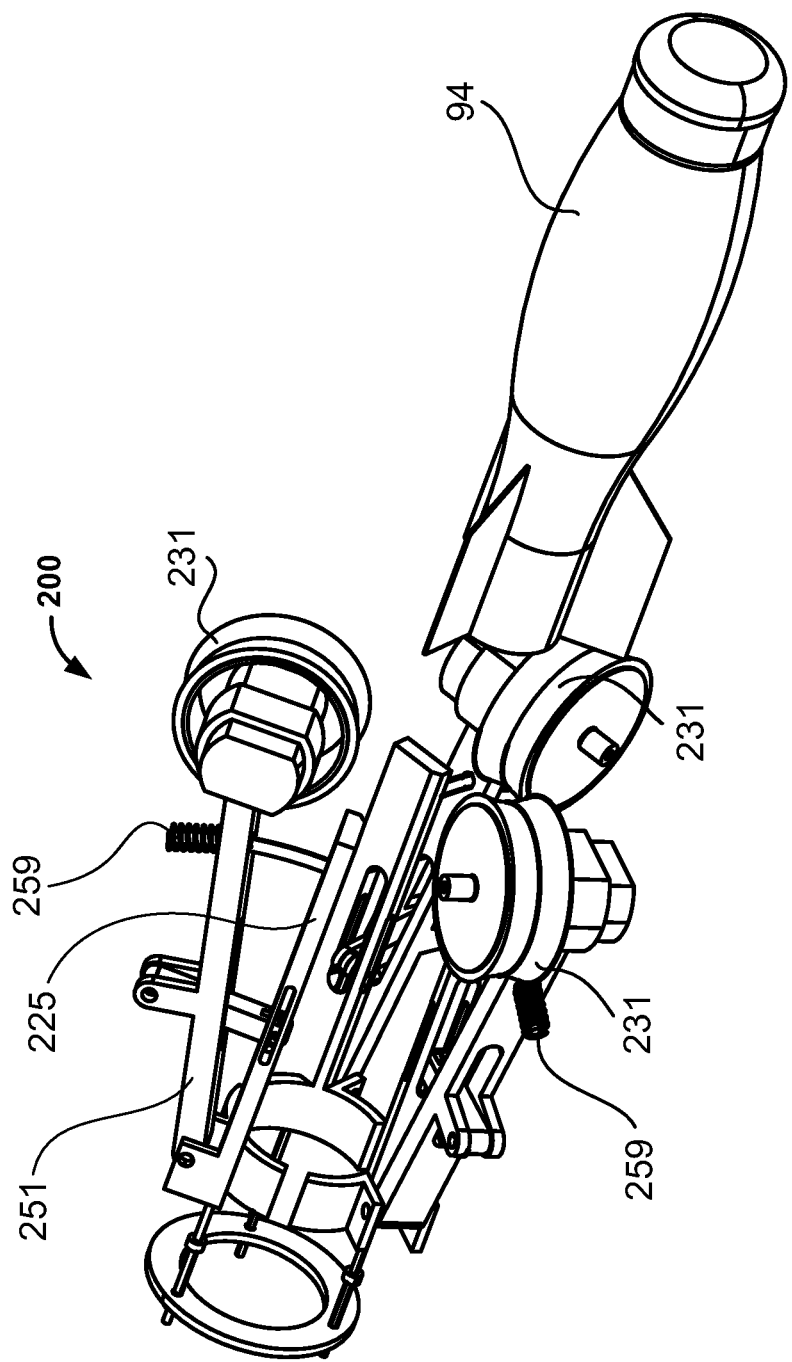
FIG. 2M is a perspective view of the three-wheeled actuated projectile launcher of FIGS. 2A-2H launching a contoured projectile in accordance with various embodiments.

FIG. 2M illustrates the actuated projectile launcher 200 launching a contoured and finned projectile 94. The spring 259 that biases the pivoting support arms 251 toward the slotted servo actuating arm 225 of the base structure 210 may ensure that the propulsion wheels 231 stay engaged with the counters of the projectile 94 while propelling it from the actuated projectile launcher 200.

FIGS. 3A-3D illustrate an actuated projectile launcher 300 in different stages of a cycle of launching a projectile 92 in accordance with various embodiments. The actuated projectile launcher 300 is an alternative dual-wheel projectile launcher suitable for use with various embodiments. The actuated projectile launcher 300 includes a base structure 310, which may support various elements thereof, including a projectile support 320, two propulsion wheels 331, and two sets of support arms 350. In some embodiments, each set of support arms 350 includes a pair of spring-loaded support bars 351 that extend parallel to one another laterally on opposed sides of the projectile support 320. The pair of spring-loaded support bars 351 together carry a support carriage 353 that is configured to move laterally inward and outward along the spring-loaded support bars 351. One of the propulsion wheels 331, along with a corresponding motor 321, may be supported by each of the support carriages 353 of the support arms 350.

The base structure 310 may be part of a frame, casing, or other structure configured to serve as a foundation for supporting the various elements of the actuated projectile launcher 300.

The projectile support 320 may be any element that holds the projectile 92 in a loaded position in a holding area ready to be fired, until the propulsion wheels 331 come together to expel the projectile 92 from the holding area. For example, the projectile support 320 may be a cylindrical tube, the inside of which forms the holding area, and which is part of or fixed to the base structure 310. In FIGS. 3A-3D, the projectile 92 is configured to be loaded into the holding area from a back of the projectile support 320. Alternatively, the projectile 92 may be loaded from the front of the projectile support 320.

The two propulsion wheels 331 may be selectively driven to rotate opposite one another by separate motors 321. The propulsion wheels 331 are configured to engage the projectile 92 from opposite sides, so the opposite rotation ensures that engagement pushes the projectile 92 in the same direction. The propulsion wheels 331 may be formed with compliant outer surfaces, such as a high-friction surface like neoprene or other rubbery gription material with rugged texture and durable material. The two propulsion wheels 331 may be flywheels configured to store rotational energy and translate that rotational energy into a linear force for propelling the projectile 92. As flywheels, each motor 321 may spin its corresponding propulsion wheel 331 until it reaches full rotational velocity, or some other target rotational velocity. In response to the flywheels (i.e., the propulsion wheels 331) reaching that target rotational velocity, the motors 321 may be turned off and an actuator can quickly move the support carriage 353 along the spring-loaded support bars 351, causing the propulsion wheels 331 to move toward one another to engage the projectile 92 therebetween. Alternatively, the timing of the shut off of the motors 321, relative to when the support carriages 353 are moved to the contracted position, may be adjusted as needed (e.g., before or after engagement of the propulsion wheels 331 with the projectile 92).

Each pair of spring-loaded support bars 351 may together support one of the support carriages 353, which in-turn supports one of the propulsion wheels 331. A first end of the support arms 350, which corresponds to an outside of each of the support carriages 353, may hold one of the propulsion wheels 331 and an opposed second end of the support arms 350, which may correspond to an inside of each of the pair of spring-loaded support bars 351, may be secured to the base structure 310. Each support carriage 353 riding along the pair of spring-loaded support arms 351 is configured to move one of the two propulsion wheels 331, through a linear movement, between an expanded position and a contracted position. In addition, the support carriages 353 may each be biased toward the contracted position by the biasing springs of the spring-loaded support bars 351. In this way, each of the support carriages 353 may be spring-loaded to encourage the propulsion wheels 331 toward the contracted position. In the expanded position, the propulsion wheels 331 may be as far apart or almost as far apart as they can get. In contrast, the propulsion wheels 331 are closer to one another in the contracted position as compared to the expanded position. The movement of the propulsion wheels 331 toward the contracted position is configured to bring the two propulsion wheels 331 into engagement with the projectile 92 and drive the projectile 92 from the holding area of the actuated projectile launcher 300.

In some embodiments, the support carriage 353 may have a spring or similar resilient element restricting movement of the support carriage 353 along the pair of spring-loaded support bars 351 to soften the impact between the propulsion wheels 331 and the projectile 92. Also, such a resilient element may bias the support carriage 353 toward the contracted position, which may help get the propulsion wheels 331 to engage the projectile 92 as quickly as possible.

The actuated projectile launcher 300 may include an over-center linkage configured to guide the support arms 350, and particularly the support carriages 353, between the expanded position and the contracted position. An over-center linkage uses multiple rigid bars or links connected by joints to constrain motion between the links and of the overall linkage. In various embodiments, the over-center linkage may include at least one pivotal joint with a slide mechanism that is unstable at a central position of the slide path. This unstable central position encourages a pivot point 345, to slide to one side or the other of that central position. In this way, the pivot point 345 may have so-called "resting positions" to either side of the central position.

In particular, the over-center linkage may be a group of elements that include separate over-center links 341 for each of the support arms 350, a slotted servo trigger bar 361 configured to move an over-center carriage 363. Each of the over-center links 341 may be pivotally coupled at a first end to a different one of the support carriages 353. Also, each of the over-center links may be pivotally coupled at a second end to the over-center carriage 363. An actuator arm 375 of a motor 370 may be pivotally coupling to the slotted servo trigger bar 361 through an elongate slot 327 formed in the slotted servo trigger bar 361. The elongate slot 327 enables a pivotal coupling of the actuator arm 375 to slide linearly along a segment of the slotted servo trigger bar 361 while maintaining the pivotal coupling to the base structure 310. The over-center carriage 363 may be secured to a second end of the over-center links 341 and may be configured to slide along an axial extent of the support structure 320. The elongate slot 327 enables a guidepost of the actuator arm 375 to slide linearly along a segment of the slotted servo trigger bar 361 while maintaining the pivotal coupling therebetween. The elongate slot 327 functions like a track that guides the movement of the slotted servo trigger bar 361, which in-turn linearly moves the over-center carriage 363, and moves the second ends of the over-center links 341 (i.e., causes the over-center links 341 to pivot). Alternatively, a different form of track may be used to enable a linear movement of the slotted servo trigger bar 361 and the over-center carriage 363. In the actuated projectile launcher 300, the second end of both of the over-center links 341 are secured to the same over-center carriage 363. In this way, pivotal movement of the two over-center links 341 is guided by the same over-center carriage 363.

The actuator 370 may be configured to move to the slotted servo trigger bar 361, along with the second ends of the over-center links 341, between a first position and a second position. The actuator 370 may be a servo motor configured to pivot the actuator arm 375 that controls the sliding movement of the over-center carriage 363 by the slotted servo trigger bar 361. Movement of the slotted servo trigger bar 361 and the over-center carriage 363 by the actuator 370 into the first position also moves the propulsion wheels 331 into the expanded position. Similarly, movement by the actuator 370 into the second position moves the propulsion wheels 331 into the contracted position. Before reaching the fully contracted position (i.e., the closest support arms 350 may allow the propulsion wheels 331 to get to one another), the propulsion wheels 331 may engage and propel the projectile 92 if loaded in the holding area. As a result of the biasing spring(s) built into or on the spring-loaded support bars 351 that encourage the support carriages 353 toward the contracted position, the loose guided movement of the slotted servo trigger bar 361 by the guidepost of the actuator arm 375 may enable a quick snapping movement of the slotted servo trigger bar 361 as the over-center support carriage 363 pushes the first end of the over-center links 341 through an over-center position. The over-center position may correspond to when the over-center links 341 are perpendicular to the elongate slot 327. At or beyond the over-center position, the force from the spring-loaded support bars 351 may take over and start pushing the support carriages 353 and propulsion wheels 331 toward the contracted position, as well as pivoting the over-center links 341 and linearly moving the over-center carriage 363 rearward.

Figure 3B:
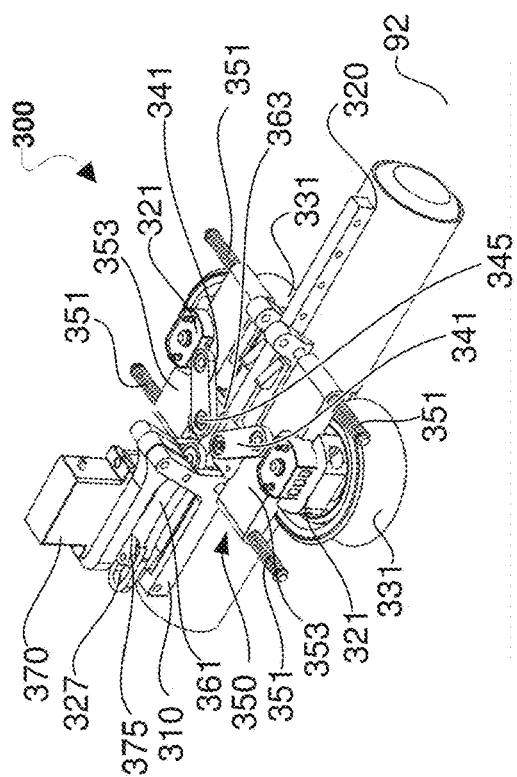
FIGS. 3A-3D are perspective views of another two-wheeled actuated projectile launcher in various stages of launching a projectile in accordance with various embodiments.
Figure 3D:
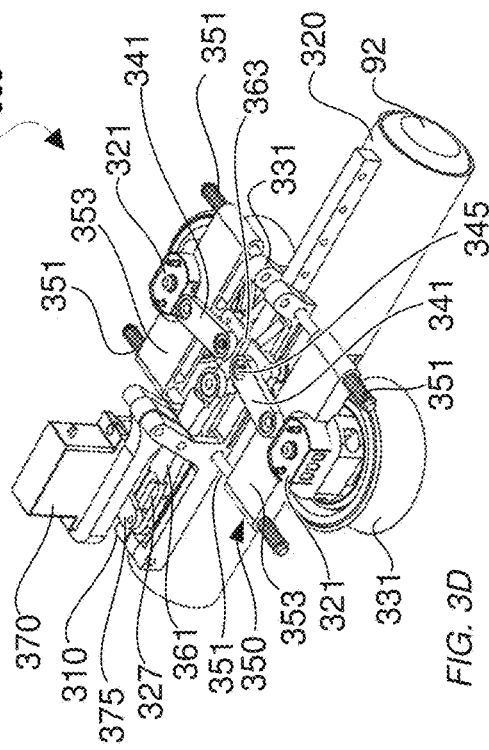
Figure 3A:
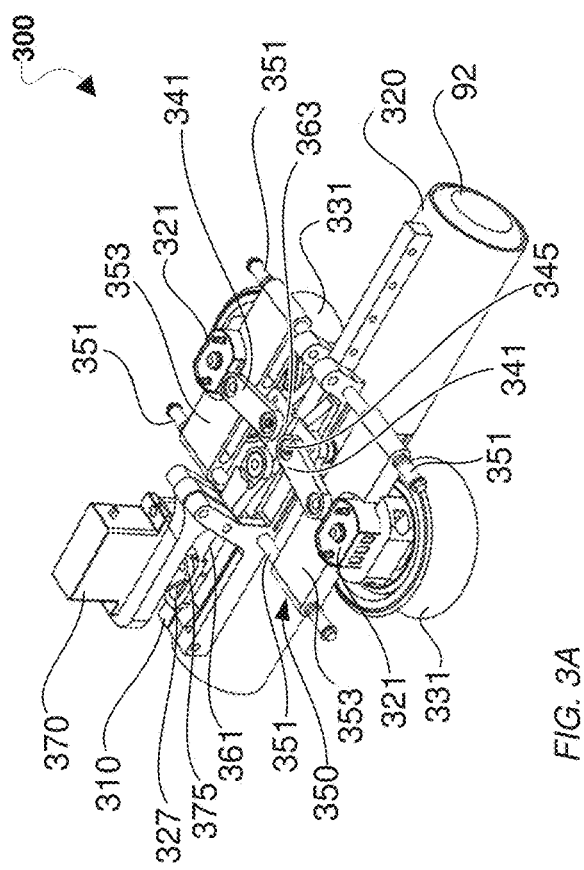

In FIG. 3A, the actuated projectile launcher 300 is in a reset position. In the reset position, the propulsion wheels 331 are in the expanded position as a result of the over-center carriage 363 being in a forward position and the over-center links 341 forcing the support carriages 353 laterally outward. In the expanded position, the projectile 92 may be loaded into the holding area of the projectile support 320.

In FIG. 3B, the actuated projectile launcher 300 is in a firing position. In the firing position, the propulsion wheels 331 are in the contracted position as a result of the over-center carriage 363 being pulled to a rearward position and the over-center links 341 forcing the support carriages 353 laterally inward. In the contracted position, the propulsion wheels 331 engage opposed sides of the projectile 92, through an aperture in the projectile support 320. This engagement of the propulsion wheels 331 with the projectile 92 transfers rotational energy from the propulsion wheels 331 to the projectile 92, which will eject the projectile from the holding area of the projectile support 320.

Figure 3C:
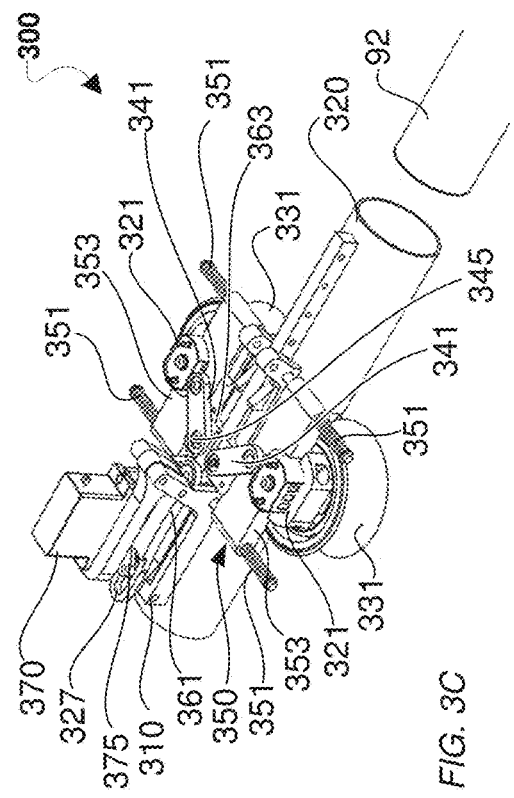

In FIG. 3C, the actuated projectile launcher 300 is in a discharged position. In the discharged position, the propulsion wheels 331 may still be in the contracted position, but the projectile 92 has been expelled from the projectile support. In the discharged position, like the firing position, the over-center carriage 363 may be in a rearward position and the over-center links 341 have forced the support carriages 353 laterally inward.

In FIG. 3D, the actuated projectile launcher 300 is in a ready position. In the ready position, the propulsion wheels 331 are in the expanded position as a result of the over-center carriage 363 having been made to return to the forward position and the over-center links 341 forcing the support carriages 353 laterally outward. In the expanded position, another projectile 92 may be loaded into the holding area of the projectile support 320.

Figure 4:
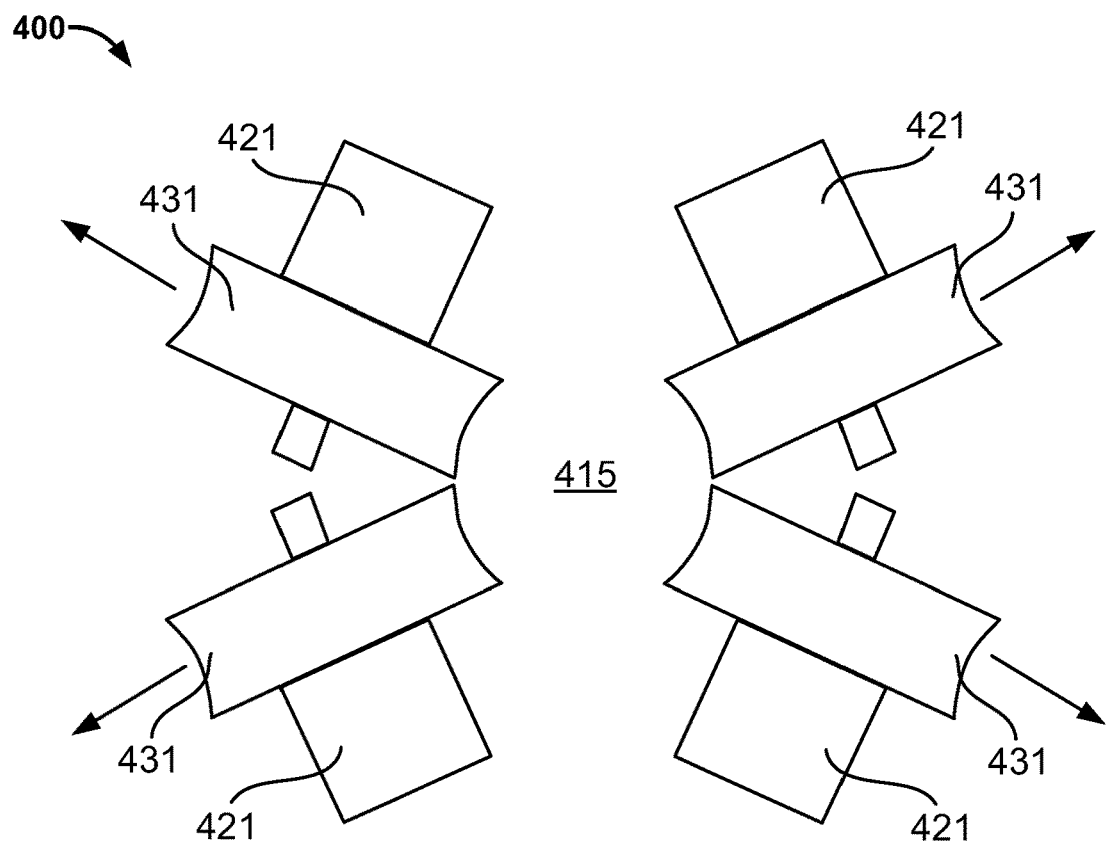
FIG. 4 is a schematic front elevation view of a quad-flywheel assembly suitable for various embodiments.

FIG. 4 illustrates a front elevation view of a quad-wheel projectile launcher 400 suitable for various embodiments. The quad-wheel projectile launcher 400 may include four propulsion wheels 431 each separately driven by separate motors 421. The four propulsion wheels 431 are illustrated in a contracted position in which the propulsion wheels 431 are closer to one another than in any other position. It should be noted that no projectile is illustrated as occupying the holding area 415 between the four propulsion wheels 431. In accordance with various embodiments, the four propulsion wheels 431 may be made to pivot away from one another toward an expanded position. The pivoting structures and linkages configured to enable the four propulsion wheels 431 to pivot in this way may be similar to those described above with regard to FIGS. 1A-1G, FIGS. 2A-2H, or a combination thereof.

Figure 5:
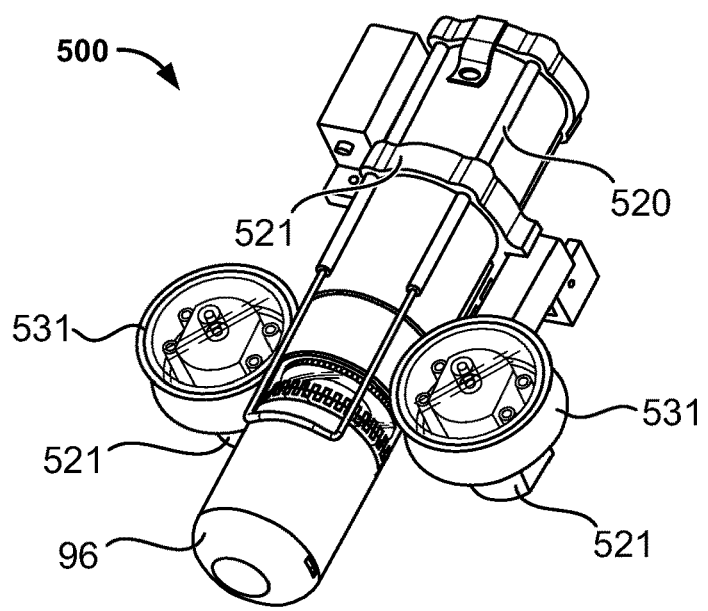
FIG. 5 is a top perspective view of a two-wheeled actuated projectile launcher with a projectile support frame according to various embodiments.

FIG. 5 illustrates an actuated projectile launcher 500 that includes a projectile support frame 520 in accordance with various embodiments. The projectile support frame 520 may include bars and a frame 521 configured to hold a projectile 96 in a holding area between the propulsion wheels 531 driven by the motors 521.

Figure 6A:
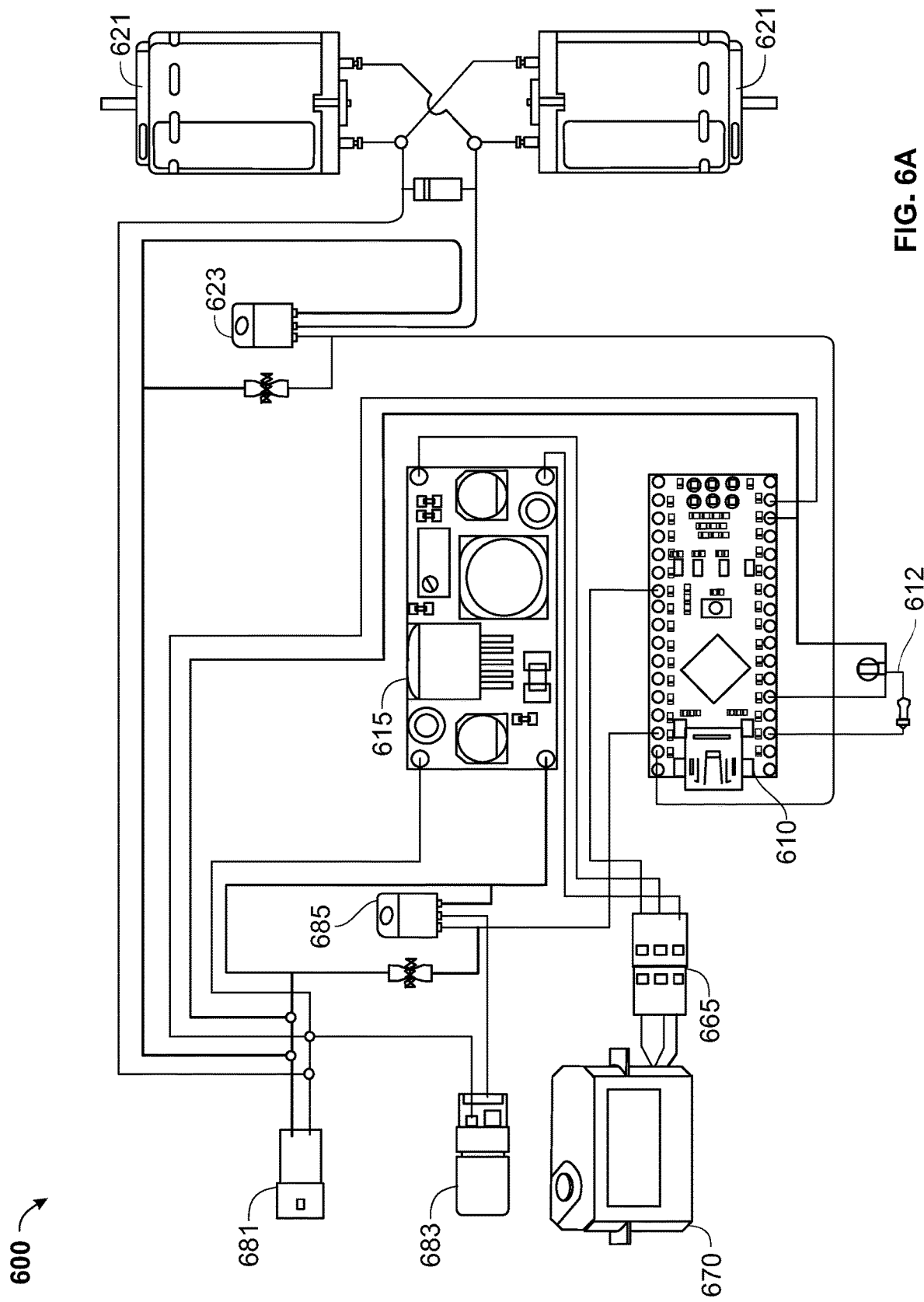
FIG. 6A is a schematic system diagram of elements of an actuated projectile launcher according to various embodiments.

FIG. 6A illustrates a schematic configuration of elements of an actuated projectile launcher 600 according to various embodiments. In particular, the actuated projectile launcher may include a processor 610 (e.g., a microprocessor) that may be configured to control operations of the actuated projectile launcher 600. Such control of the actuated projectile launcher 600 may be in response to control signals received (e.g., wirelessly) from an operator or may be performed autonomously or semi-autonomously by the processor 610. In some embodiments, the actuated projectile launcher 600 may include a photo diode 612, which may be configured to sense light output, which may be used to activate features. For example, in response to the photo diode 612 detecting that a light is turned on (e.g., a light on a UAV carrying the actuated projectile launcher 600), the processor 610 may receive a signal that triggers the actuated projectile launcher 600. Similarly, in response to the photo diode 612 detecting that a light is turned off, the processor 610 may receive a signal that powers down or turns off the actuated projectile launcher 600. The processor 610 may selectively activate/deactivate the motors 621, which may be servomotors configured to rotate a central shaft coupled to the propulsion wheels (e.g., 131, 231, 431, 531). Additional circuit elements may be included between the processor 610 and the motors 621, such as a MOSFET transistor 623, which may convert a pulse width modulation (PWM) signal from the processor 610 to volts of direct current (VDC) for the motors 621.

The processor 610 may selectively activate/deactivate an over-center trigger servo 670 (e.g., actuator 170), which may control the operation of the over-center linkages. Additional circuit elements may be included between the processor 610 and the over-center trigger servo 670, such as a servo plug 665.

The processor 610 may also selectively activate/deactivate a laser pointer 683 or other elements of the system. The laser pointer 683 may be used for targeting of the projectile (e.g., 90, 92, 94, 96). The controller 610, motors 621, over-center trigger servo 670, and other components of the actuated projectile launcher 600 may be powered by a battery, which may be connected through a battery connector 681. Power from the battery may be passed through a DC-DC converter 615. Further, the system may include a MOSFET transistor 685, which may convert PWM signals to VDC, such as for the laser pointer 681.

Figures 6B, 6C:
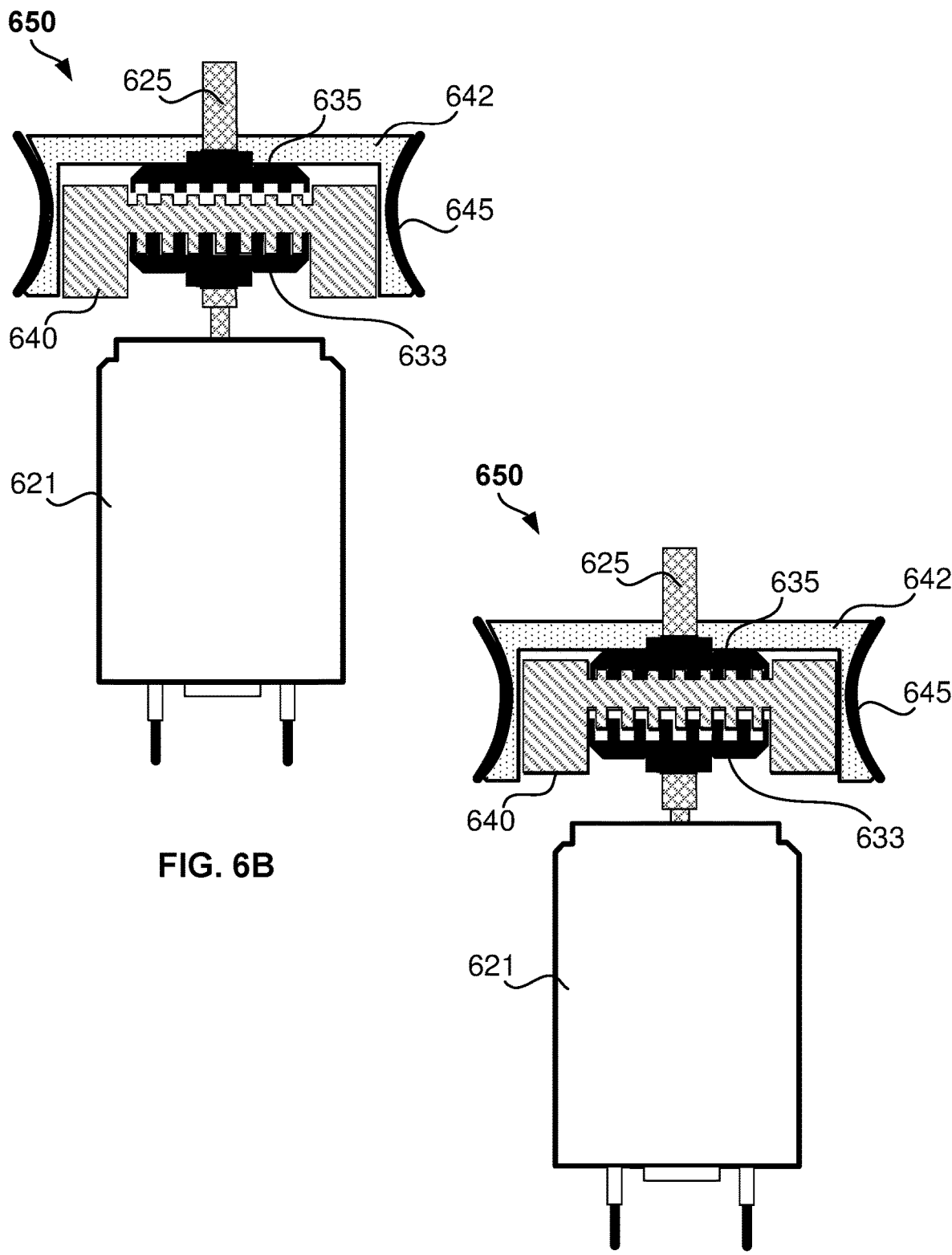
FIGS. 6B and 6C are schematic side views of an embodiment flywheel assembly with a locker clutch in disengaged and engaged positions, respectively, according to various embodiments.

FIGS. 6B and 6C illustrate schematic side views of a flywheel assembly 650 with a locker clutch 633, 635 in disengaged and engaged positions, respectively, according to various embodiments. In particular, the flywheel assembly includes a propulsion wheel 642 mounted on a drive axis 625 and is configured to be driven to rotate by the motor 621. The propulsion wheel 642 may have an outer gripping surface 645 configured to grip and propel a projectile. The outer gripping surface 645 may be a high friction and/or highly compliant material suited to transfer rotational energy from the flywheel assembly 650 to the projectile.

The flywheel assembly 650 additionally includes a weighted wheel 640 that is configured to rotate separately around the drive axis from the propulsion wheel when the flywheel assembly is in the disengaged position (e.g., FIG. 6B). The weighted wheel 640 may be heavier than the propulsion wheel 642. In addition, the flywheel assembly 650 may include a locker clutch 633, 635, which includes a lower clutch portion 633 and an upper clutch portion 635. One or both of the lower and upper clutch portions 633, 635 may include clutch teeth configured to engage corresponding teeth on the weighted wheel 640. For example, in the disengaged position shown in FIG. 6B, the weighted wheel 640 is in a lower position such that upper teeth thereof are not engaged with the opposed clutch teeth of the upper clutch portion 633. In the disengaged position, the weighted wheel 640 may be made to spin by the motor 621 without spinning the propulsion wheel. An actuator assembly may push the weighted wheel 640 along the drive axis 625 toward the upper clutch portion 635 until the clutch teeth engage the corresponding teeth of the weighted wheel 640. Once the teeth of the weighted wheel 640 are engaged with the teeth of the upper clutch portion 635, the upper clutch portion 635 will be rotationally fixed to the weighted wheel 640. In this way, by adding a locker clutch 633, 635, the weighted wheel 640 may be made to spin up without the propulsion wheel 642 spinning. This allows for static friction to be the initial friction instead of dynamic friction. At the same time, once the weighted wheel 640 is moved into the engaged position in FIG. 6C, the rotational inertia may be instantly applied/transferred to the propulsion wheel 642, which may provide an efficient transfer of energy. Additionally, or alternatively, a ratcheting pawl assembly may be included between the weighted wheel 640 and the propulsion wheel 642.

Figure 7A:
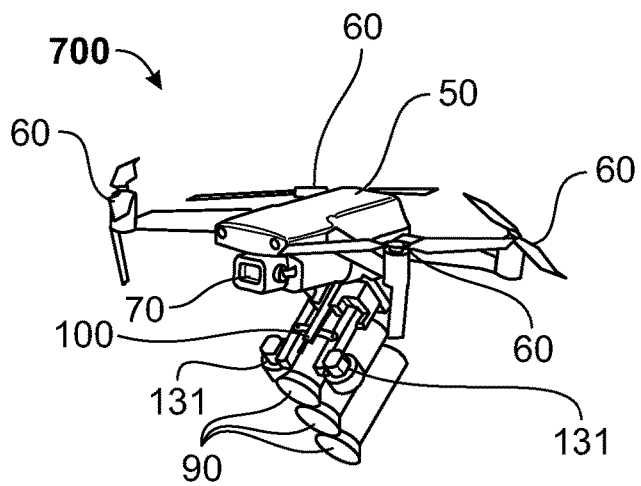
FIGS. 7A-7C are perspective views of a mobile system for launching projectiles in various stages of launching a projectile in accordance with various embodiments.
Figure 7B:
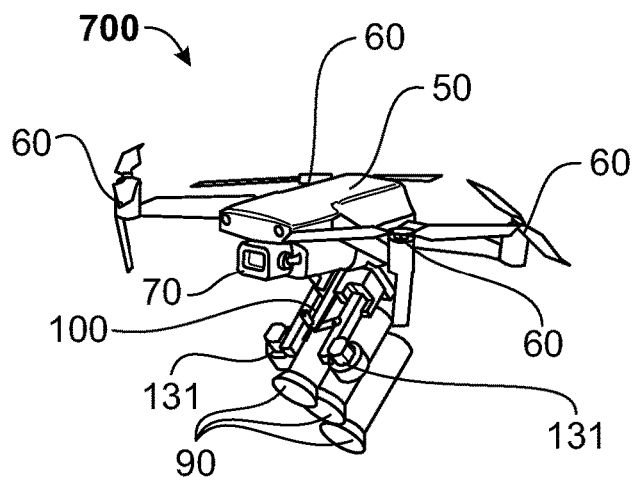
Figure 7C:
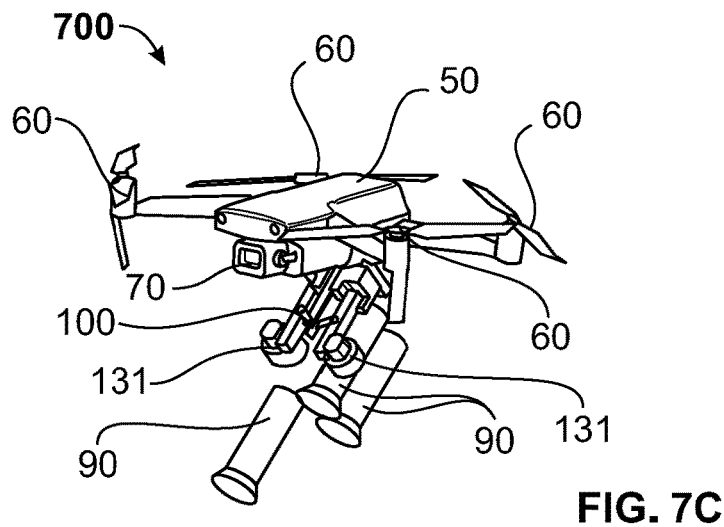

FIGS. 7A-7C illustrate a mobile system 700 for launching projectiles in various stages of launching a projectile 90 in accordance with various embodiments. The mobile system 700 includes a mobile platform in the form of a UAV 50 configured to transport the actuated projectile launcher 100 described above with regard to FIGS. 1A-1G. The UAV 50 is illustrated as a quad-copter with four rotors 60, but other forms of UAV, such as UAVs with a different number of rotors including single rotor UAVs, fixed-wind UAVs, and fixed-wing hybrid VTOL UAVs, may be suitable for use with various embodiments. In fact, the actuated projectile launcher 100 may be connected to many different types of mobile platforms, such as an autonomous, semi-autonomous, or manually operated vehicle, whether that vehicle is capable of flight, travels on the ground, travels on or under the water, or some combination thereof.

The UAV 50 may be configured to navigate a flight path that travels to a target of its projectiles (e.g., 90, 92, 94, 96). In addition, when traversing a flight path, an optical sensor of the UAV 50 may be aimed down toward a target. The UAV 50 may be equipped with various sensors, including an optical sensor 70, such as one or more camera(s) (e.g., 820 in FIG. 8), which may be capable of capturing and distinguishing visible, infrared, ultraviolet, and/or other wavelengths of light. The optical sensor 70 may be used to identify a target and aim the actuated projectile launcher 100 when desired at the identified target.

Figure 8:
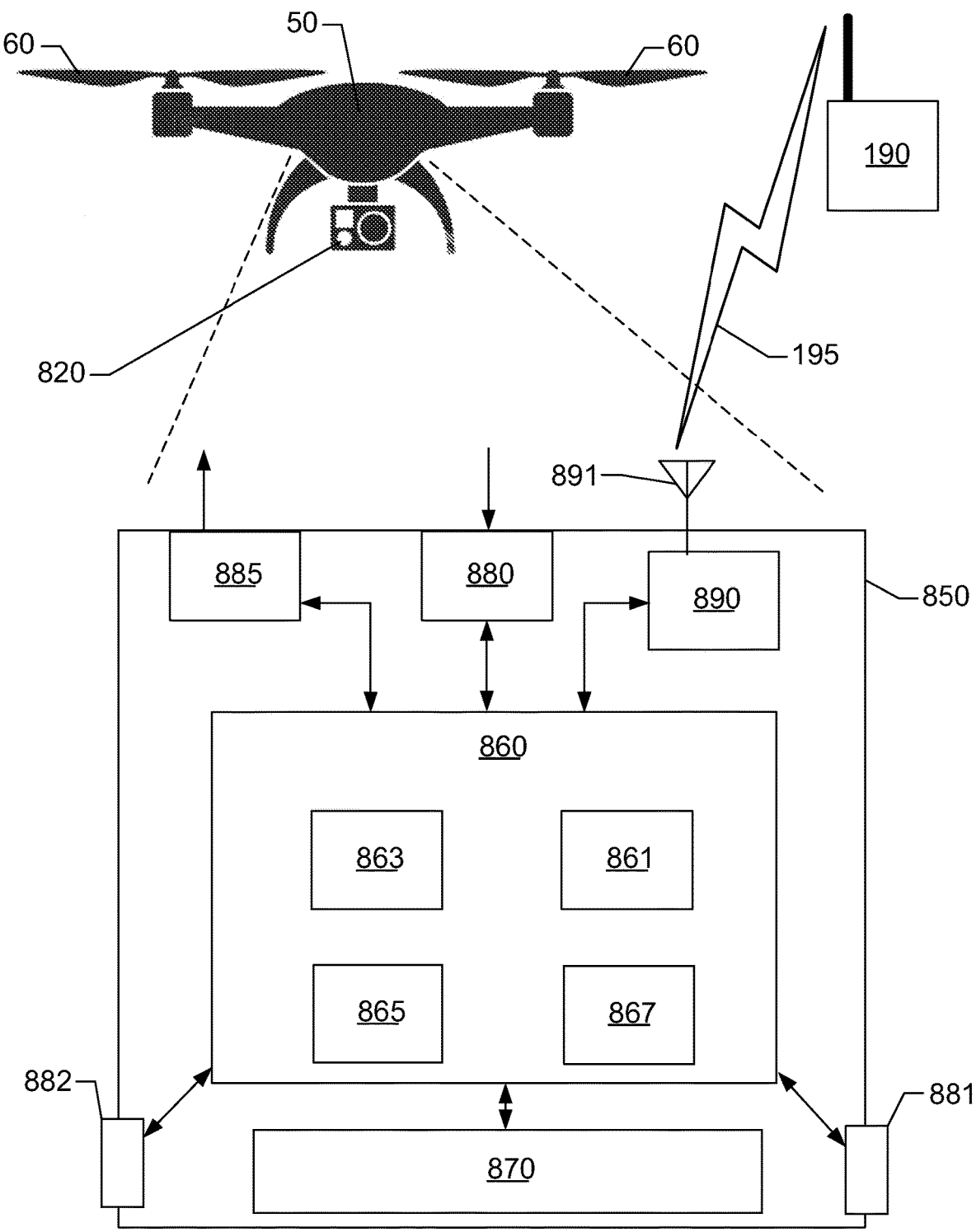
FIG. 8 is system diagram of a UAV suitable for use with various embodiments.

FIG. 8 illustrates a configuration of the UAV 50 that may be used for any of the UAVs in various embodiments. With reference to FIGS. 1-8, the UAV 50 may include a control unit 850 that may house various circuits and devices used to power and control the operation of the UAV 50. The control unit 850 may include a processor 860, a power module 870, an input module 880, an image sensor 881, other sensors 882, an output module 885, and a radio module 890 coupled to an antenna 891. The processor 860 may include or be coupled to memory 861 and a navigation unit 863. The processor 860 may be configured with processor-executable instructions to control flight and other operations of the UAV 50, including operations of the various embodiments. The processor 860 may be coupled to one or more image sensors 881 and other sensors 882.

The image sensor 881 may include one or more image capturing devices for photographing targets of the actuated projectile launcher (e.g., 100). More than one image capturing device may be configured to contemporaneously capture multiple different images. Alternatively, the image sensor 881 may be configured to detect light in the infrared spectrum for thermal imaging.

The other sensors 882 may be optical sensors (e.g., light meters for controlling exposure and determining whether additional illumination is required), radio sensors, a rotary encoder, pressure sensors (i.e., for detecting wind, lift, drag, or changes therein) or other sensors.

The power module 870 may include one or more batteries that may provide power to various components, including the processor 860, the input module 880, the image sensor 881, the other sensors 882, the output module 885, and the radio module 890. In addition, the power module 870 may include energy storage components, such as rechargeable batteries. The processor 860 may be coupled to an output module 885, which may output control signals for managing the motors that drive the rotors 60 and other components.

Through control of the individual motors of the rotors 60, the UAV 50 may be controlled in flight, such as on a predetermined flight path. The processor 860 may receive data from the navigation unit 863 and use such data in order to determine the present position and orientation of the UAV 50, as well as the appropriate course along the predetermined flight path. In various embodiments, the navigation unit 863 may include a global navigation satellite system (GNSS) receiver system (e.g., one or more Global Positioning System (GPS) receivers) enabling the UAV 50 to navigate using GNSS signals. Alternatively, or in addition, the navigation unit 863 may be equipped with radio navigation receivers for receiving navigation beacons or other signals from radio nodes, such as navigation beacons (e.g., very high frequency (VHF) Omni Directional Radio Range (VOR) beacons), Wi-Fi access points, cellular network sites, radio station, remote computing devices, other UAVs, etc.

The processor 860 and/or the navigation unit 863 may be configured to communicate with a server through a wireless connection (e.g., a cellular data network) to receive commands to use or stop using the extended flight protocol, receive data useful in navigation, provide real-time position altitude reports, and assess data. An avionics module 867 coupled to the processor 860 and/or the navigation unit 863 may be configured to provide flight control-related information such as altitude, attitude, airspeed, heading and similar information that the navigation unit 863 may use for navigation purposes, such as dead reckoning between GNSS position updates. The avionics module 867 may include or receive data from a gyro/accelerometer unit 865 that provides data regarding the orientation and accelerations of the UAV 50 that may be used in navigation and positioning calculations.

The radio module 890 may be configured to receive signals via the antenna 891, such as command signals, receive signals from aviation navigation facilities, etc., and provide such signals to the processor 860 and/or the navigation unit 863 to assist in operation of the UAV 50. In some embodiments, commands for controlling the UAV 50 or components thereof may be received via the radio module 890. In some embodiments, the UAV 50 may receive signals from the computing device 190 (e.g., a wireless control unit). For example, the wireless link 195 may include input from a knowledge base regarding current conditions, predicted future conditions, requirements for particular UAV flight paths, or aiming parameters of the camera.

In various embodiments, the radio module 890 may be configured to switch between a cellular connection and a Wi-Fi or other form of radio connection depending on the location and altitude of the UAV 50. For example, while in flight at an altitude designated for UAV traffic, the radio module 890 may communicate with a cellular infrastructure in order to maintain communications with a server. In addition, communications with the computing device 190 may be established using cellular telephone networks while the UAV 50 is flying out of line-of-sight with an operator. Communication between the radio module 890 and the wireless link 195 may transition to a short-range communication link (e.g., Wi-Fi or Bluetooth) when the UAV 50 moves closer to the computing device 190. Similarly, the UAV 50 may include and employ other forms of radio communication, such as mesh connections with other UAVs or connections to other information sources (e.g., balloons or other stations for collecting and/or distributing weather or other data harvesting information).

In various embodiments, the control unit 850 may be equipped with the input module 880, which may be used for a variety of applications. For example, the input module 880 may receive and pre-process images or data from an onboard image sensor 881 or another sensor 882. Also, the input module may receive electronic signals from other components (e.g., a remote computing device and/or solar tower). The input module 880 may receive an activation signal for causing actuators on the UAV 50 to deploy landing cushions or similar components for affecting an emergency landing. In addition, the output module 885 may be used to activate components (e.g., an image sensor, one or more other sensors, an energy cell, an actuator, an indicator, a circuit element, and/or an energy-harvesting element).

While the various components of the control unit 850 are illustrated in FIG. 8 as separate components, some or all of the components (e.g., the processor 860, the output module 885, the radio module 890, and other units) may be integrated together in a single device or module, such as a system-on-chip module.

The processors implementing various embodiments may be any programmable microprocessor, microcomputer or multiple processor chip or chips that can be configured by software instructions (applications) to perform a variety of functions, including the functions of the various embodiments described in this application. In some communication devices, multiple processors may be provided, such as one processor dedicated to wireless communication functions and one processor dedicated to running other applications. Typically, software applications may be stored in the internal memory before they are accessed and loaded into the processor. The processor may include internal memory sufficient to store the application software instructions.

Figures 9A, 9B:
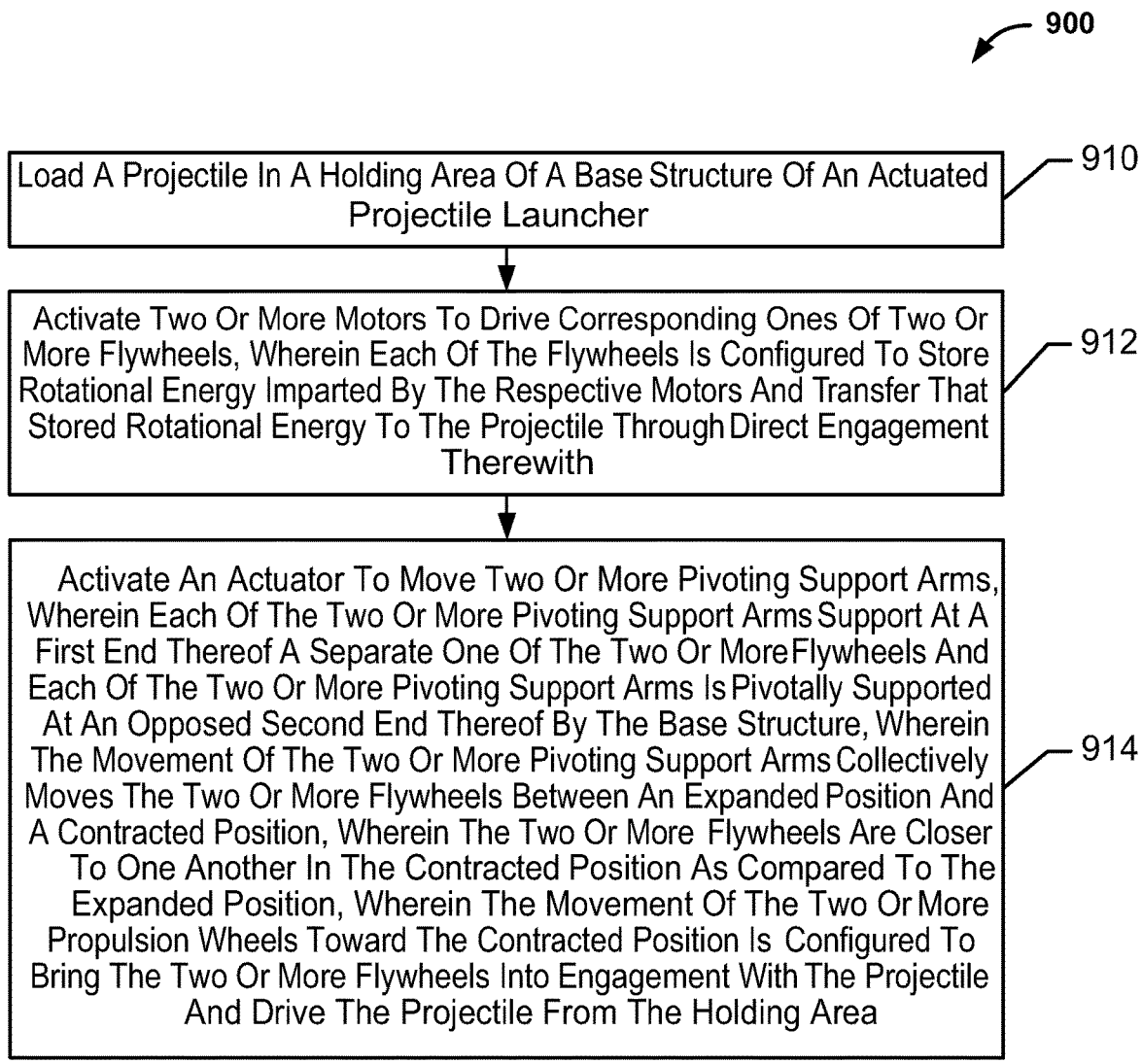
FIGS. 9A-9B are process flow diagrams each illustrating a method for launching projectiles according to various embodiments.

FIG. 9A illustrates a method 900 for launching projectiles according to various embodiments. With reference to FIGS. 1A-9A, operations of the method 900 may be performed by a UAV (e.g., 50 in FIG. 8), a control unit (e.g., 850 in FIG. 8), a remote computing device (e.g., 190 in FIG. 8), and/or another computing device in communication with the UAV.

In block 910, a projectile (e.g., 90, 92, 94, 96) may be loaded in a holding area (e.g., 415) of a base structure (e.g., 110, 210) of an actuated projectile launcher (e.g., 100, 200, 400, 500). Loading the projectile into the holding area may be an automatic operation performed by a projectile loader or may be a manual operation performed by a handler of the UAV and/or the actuated projectile launcher. With one or more projectiles loaded, the actuated projectile launcher may be moved to a location where it may be used. For example, the UAV carrying the actuated projectile launcher may fly over cattle to diagnose sick cattle.

In block 912, two or more motors (e.g., 121, 221, 421, 621) may be activated to drive corresponding ones of the two or more flywheels (e.g., 131, 231, 431, 531). Each of the flywheels may be configured to store rotational energy imparted by the respective motors and transfer that stored rotational energy to the projectile through direct engagement therewith. For example, when cattle exhibiting illness are identified, the pilot may turn on the light of the UAV that is tied to control of the actuated projectile launcher.

In block 914, an actuator may be activated to move the two or more support arms (e.g., 151, 251). Each of the two or more support arms may support at a first end thereof a separate one of the two or more flywheels and each of the two or more support arms may be supported at an opposed second end thereof by the base structure. The movement of the two or more support arms may move the two or more flywheels between an expanded position and a contracted position in unison, wherein the two or more flywheels are closer to one another in the contracted position as compared to the expanded position. The movement of the two or more propulsion wheels toward the contracted position may be configured to bring the two or more flywheels into engagement with the projectile and drive the projectile from the holding area. In an alternative embodiment, the two or more flywheels may be brought into engagement with the projectile independently of one another.

For example, the pilot may aim the projectile as the flywheels spin up and when a desired marking location is targeted, the pilot may shut off the UAV light and the actuated projectile launcher will launch the projectile. With the flywheels rotating at full operating speed, turning off the UAV light will trigger the propulsion wheels to grab the projectile and transfer the rotary inertia to a linear force for propelling the projectile. In the context of a cattle marking system, this will apply a temporary non-toxic marking medium on the cattle. The cattle handlers can then visually identify and separate them for treatment Following the operations in block 914, method 900 may be repeated as described.

FIG. 9B illustrates a method 901 for launching projectiles according to various embodiments. With reference to FIGS. 1A-9B, operations of the method 901 may be performed by a UAV (e.g., 50 in FIG. 8), a control unit (e.g., 850 in FIG. 8), a remote computing device (e.g., 190 in FIG. 8) and/or another computing device in communication with the UAV.

In block 916, the two or more motors driving the corresponding ones of the two or more flywheels may be de-activated in response to the activation of the actuator in block 914. In some embodiments, the de-activation of the two or more motors may coincide with the activation of the actuator.

Following the operations in block 916, the UAV, the control unit, the remote computing device, and/or another computer may perform the operations in block 910 of the method 900 as described.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods and operations 900 and 901 may be substituted for or combined with one or more operations of the methods 900 and 901, and vice versa.

Implementation examples are described in the following paragraphs. While some of the following implementation examples are described in terms of example methods, further example implementations may include: the example methods discussed in the following paragraphs implemented by a computing device comprising a processor configured with processor-executable instructions to perform operations of the methods of the following implementation examples; the example methods discussed in the following paragraphs implemented by a computing device comprising means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1. An actuated projectile launcher, including: a base structure; a projectile support configured to maintain a projectile in a holding area from which the projectile launches; two or more propulsion wheels selectively driven to rotate; and two or more support arms, each supporting at a first end thereof a separate one of the two or more propulsion wheels and being supported at an opposed second end thereof by the base structure, in which the two or more support arms are configured to move the two or more propulsion wheels between an expanded position and a contracted position, in which the two or more propulsion wheels are closer to one another in the contracted position as compared to the expanded position, in which the movement of the two or more propulsion wheels toward the contracted position is configured to bring the two or more propulsion wheels into engagement with the projectile and drive the projectile from the holding area.

Example 2. The actuated projectile launcher of example 1, in which each of the two or more propulsion wheels is a flywheel configured to store rotational energy imparted by a motor and transfer that stored rotational energy to the projectile through direct engagement therewith.

Example 3. The actuated projectile launcher of any of examples 1-2, further including: an over-center linkage configured to guide at least one of the two or more support arms between the expanded position and the contracted position, in which the over-center linkage includes separate over-center links for each of the two or more support arms, in which each of the over-center links is pivotally coupled at a first end to a different one of the two or more support arms and pivotally coupled at a second end to the base structure.

Example 4. The actuated projectile launcher of example 3, in which the second end of each of the over-center links is configured to slide linearly along a segment of the base structure while maintaining the pivotal coupling to the base structure.

Example 5. The actuated projectile launcher of example 3, in which the second end of each of the over-center links is secured to a guidepost configured to slide along a track that is fixed relative to the base structure while maintaining the pivotal coupling of the over-center linkage to the base structure.

Example 6. The actuated projectile launcher of example 5, in which the second end of two over-center links are secured to the same guidepost.

Example 7. The actuated projectile launcher of example 3, further including: an actuator configured to move the second end of the over-center links between a first position and a second position, in which movement by the actuator of the second end into the first position moves the two or more propulsion wheels into the expanded position and movement by the actuator of the second end into the second position moves the two or more propulsion wheels into the contracted position.

Example 8. The actuated projectile launcher of example 7, in which the second end of each of the over-center links is secured to a guidepost, in which the actuator includes a trigger bar in sliding engagement with the guidepost, in which the trigger bar includes a pair of trigger blocks disposed on opposed sides of the guidepost limiting a linear extend of movement of the guidepost along the trigger bar.

Example 9. The actuated projectile launcher of example 7, in which the actuator includes two or more guideposts, in which the second end of each of the over-center links is secured to a guidepost, in which the actuator includes a separate trigger bar secured to each of the two or more guideposts for moving the second end of the over-center links between the first position and the second position.

Example 10. The actuated projectile launcher of example 9, in which the actuator includes a trigger ring in sliding engagement with the separate trigger bars, in which each of the separate trigger bars include a pair of trigger blocks disposed on opposed sides of the trigger ring limiting a linear extend of movement of the trigger ring along the separate trigger bars.

Example 11. The actuated projectile launcher of any of examples 1-10, in which the projectile is configured to be loaded into the holding area tangentially relative to a launch direction in which the projectile is driven from the holding area by the two or more propulsion wheels.

Example 12. The actuated projectile launcher of any of examples 1-10, in which the two or more propulsion wheels include at least three propulsion wheels and the two or more support arms include at least three pivoting support arms, in which each of the at least three propulsion wheels is secured to a separate one of the at least three pivoting support arms.

Example 13. The actuated projectile launcher of example 12, in which the at least three pivoting support arms share a mechanical linkage configured to move the at least three pivoting support arms in unison.

Example 14. A mobile system for launching projectiles, including: a mobile platform; a projectile; and an actuated projectile launcher attached to the mobile platform. The actuated projectile launcher including elements of any of examples 1-13.

Example 15. A method for launching projectiles, including: loading a projectile in a holding area of a base structure of an actuated projectile launcher; activating two or more motors to drive corresponding ones of two or more flywheels, in which each of the flywheels is configured to store rotational energy imparted by the respective motors and transfer that stored rotational energy to the projectile through direct engagement therewith; activating an actuator to move two or more support arms, in which each of the two or more support arms support at a first end thereof a separate one of the two or more flywheels and each of the two or more support arms is supported at an opposed second end thereof by the base structure, in which the movement of the two or more support arms collectively moves the two or more flywheels between an expanded position and a contracted position, in which the two or more flywheels are closer to one another in the contracted position as compared to the expanded position, in which the movement of the two or more propulsion wheels toward the contracted position is configured to bring the two or more flywheels into engagement with the projectile and drive the projectile from the holding area.

Example 16. The method of example 15, further including: de-activating the two or more motors driving the corresponding ones of the two or more flywheels in response to the activation of the actuator.

Example 17. The method of example 16, in which the de-activation of the two or more motors coincides with the activation of the actuator.

Example 18. The method of any one of examples 15-17, further including loading another projectile in the holding area of the base structure of the actuated projectile launcher in response to the earlier projectile being driven from the holding area.

The foregoing method descriptions and the process flow diagrams are provided merely as illustrative examples and are not intended to require or imply that the operations of various embodiments must be performed in the order presented. As will be appreciated by one of skill in the art, the order of operations in the foregoing embodiments may be performed in any order. Words such as "thereafter," "then," "next," etc., are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents, and publications cited above are hereby incorporated by reference.

In addition, many modifications may be made to adapt a particular situation or material to the teachings of the disclosure without departing from the essential scope thereof. Therefore, it is intended that the disclosure is not limited to the particular embodiment disclosed as the best mode contemplated for carrying out this disclosure, but that the disclosure will include all embodiments falling within the scope of the appended claims.

What is claimed is:

1. An actuated projectile launcher, comprising:
   a base structure;
   a projectile support configured to maintain a projectile in a holding area from which the projectile launches;
   two or more propulsion wheels selectively driven to rotate;
   two or more support arms, each supporting at a first end thereof one of the two or more propulsion wheels and being supported at an opposed second end thereof by the base structure, wherein the two or more support arms are configured to move the two or more propulsion wheels between an expanded position and a contracted position, wherein the two or more propulsion wheels are closer to one another in the contracted position as compared to the expanded position, wherein the movement of the two or more propulsion wheels toward the contracted position is configured to bring the two or more propulsion wheels into engagement with the projectile and drive the projectile from the holding area; and
   an over-center linkage configured to guide at least one of the two or more support arms between the expanded position and the contracted position.

2. The actuated projectile launcher of claim 1, wherein each of the two or more propulsion wheels is a flywheel configured to store rotational energy imparted by a motor and transfer that stored rotational energy to the projectile through direct engagement therewith.

3. The actuated projectile launcher of claim 1,
   wherein the over-center linkage includes separate over-center links for the two or more support arms, wherein each of the over-center links is pivotally coupled at a first end to at least one of the two or more support arms and pivotally coupled at a second end to the base structure.

4. The actuated projectile launcher of claim 3, wherein the second end of each of the over-center links is configured to slide linearly along a segment of the base structure while maintaining the pivotal coupling to the base structure.

5. The actuated projectile launcher of claim 3, wherein the second end of each of the over-center links is secured to a guidepost configured to slide along a track that is fixed relative to the base structure while maintaining the pivotal coupling of the over-center linkage to the base structure.

6. The actuated projectile launcher of claim 5, wherein the second end of two over-center links are secured to the same guidepost.

7. The actuated projectile launcher of claim 3, further comprising:
an actuator configured to move the second end of the over-center links between a first position and a second position, wherein movement by the actuator of the second end into the first position moves the two or more propulsion wheels into the expanded position and movement by the actuator of the second end into the second position moves the two or more propulsion wheels into the contracted position.

8. The actuated projectile launcher of claim 7, wherein the second end of each of the over-center links is secured to a guidepost, wherein the actuator includes a trigger bar in sliding engagement with the guidepost, wherein the trigger bar includes a pair of trigger blocks disposed on opposed sides of the guidepost limiting a linear extend of movement of the guidepost along the trigger bar.

9. The actuated projectile launcher of claim 7, wherein the actuator includes two or more guideposts, wherein the second end of each of the over-center links is secured to a guidepost, wherein the actuator includes a separate trigger bar secured to each of the two or more guideposts for moving the second end of the over-center links between the first position and the second position.

10. The actuated projectile launcher of claim 9, wherein the actuator includes a trigger ring in sliding engagement with the separate trigger bars, wherein each of the separate trigger bars include a pair of trigger blocks disposed on opposed sides of the trigger ring limiting a linear extend of movement of the trigger ring along the separate trigger bars.

11. The actuated projectile launcher of claim 1, wherein the projectile is configured to be loaded into the holding area tangentially relative to a launch direction in which the projectile is driven from the holding area by the two or more propulsion wheels.

12. The actuated projectile launcher of claim 1, wherein the two or more propulsion wheels include at least three propulsion wheels and the two or more support arms include at least three support arms, wherein each of the at least three propulsion wheels is secured to a separate one of the at least three support arms.

13. The actuated projectile launcher of claim 12, wherein the at least three support arms share a mechanical linkage configured to move the at least three support arms in unison.

14. A mobile system for launching projectiles, comprising:
a mobile platform;
a projectile; and
an actuated projectile launcher attached to the mobile platform, the actuated projectile launcher comprising:
a base structure;
a projectile support configured to maintain the projectile in a holding area from which the projectile launches;
two or more propulsion wheels selectively driven to rotate;
two or more support arms, each supporting at a first end thereof a separate one of the two or more propulsion wheels and being supported at an opposed second end thereof by the base structure, wherein the two or more support arms are configured to move the two or more propulsion wheels between an expanded position and a contracted position, wherein the two or more propulsion wheels are closer to one another in the contracted position as compared to the expanded position, wherein the movement of the two or more propulsion wheels toward the contracted position is configured to bring the two or more propulsion wheels into engagement with the projectile and drive the projectile from the holding area; and
an over-center linkage configured to guide at least one of the two or more support arms between the expanded position and the contracted position.

15. The mobile system for launching projectiles of claim 14, wherein each of the two or more propulsion wheels is a flywheel configured to store rotational energy imparted by a motor and transfer that stored rotational energy to the projectile through direct engagement therewith.

16. The mobile system for launching projectiles of claim 14, wherein the over-center linkage includes separate over-center links for each of the two or more support arms, wherein each of the over-center links is pivotally coupled at a first end to a different one of the two or more support arms and pivotally coupled at a second end to the base structure.

17. The mobile system for launching projectiles of claim 16, wherein the second end of each of the over-center links is configured to slide linearly along a segment of the base structure while maintaining the pivotal coupling to the base structure.

18. The mobile system for launching projectiles of claim 16, wherein the second end of each of the over-center links is secured to a guidepost configured to slide along a track that is fixed relative to the base structure while maintaining the pivotal coupling of the over-center linkage to the base structure.

19. The mobile system for launching projectiles of claim 18, wherein the second end of two over-center links are secured to the same guidepost.

20. The mobile system for launching projectiles of claim 16, wherein the actuated projectile launcher further comprises:
an actuator configured to move the second end of the over-center links between a first position and a second position, wherein movement by the actuator of the second end into the first position moves the two or more propulsion wheels into the expanded position and movement by the actuator of the second end into the second position moves the two or more propulsion wheels into the contracted position.

21. The mobile system for launching projectiles of claim 20, wherein the second end of each of the over-center links is secured to a guidepost, wherein the actuator includes a trigger bar in sliding engagement with the guidepost, wherein the trigger bar includes a pair of trigger blocks disposed on opposed sides of the guidepost limiting a linear extend of movement of the guidepost along the trigger bar.

22. The mobile system for launching projectiles of claim 20, wherein the actuator includes two or more guideposts, wherein the second end of each of the over-center links is secured to a guidepost, wherein the actuator includes a separate trigger bar secured to each of the two or more guideposts for moving the second end of the over-center links between the first position and the second position.

23. The mobile system for launching projectiles of claim 22, wherein the actuator includes a trigger ring in sliding engagement with the separate trigger bars, wherein each of the separate trigger bars include a pair of trigger blocks disposed on opposed sides of the trigger ring limiting a linear extend of movement of the trigger ring along the separate trigger bars.

24. The mobile system for launching projectiles of claim 14, wherein the projectile is configured to be loaded into the holding area tangentially relative to a launch direction in which the projectile is driven from the holding area by the two or more propulsion wheels.

25. The mobile system for launching projectiles of claim 14, wherein the two or more propulsion wheels include at least three propulsion wheels and the two or more support arms include at least three support arms, wherein each of the at least three propulsion wheels is secured to a separate one of the at least three support arms.

26. The mobile system for launching projectiles of claim 25, wherein the at least three support arms share a mechanical linkage configured to move the at least three support arms in unison.

27. A method for launching projectiles, comprising:
loading a projectile in a holding area of a base structure of an actuated projectile launcher;
activating two or more motors to drive corresponding ones of two or more flywheels, wherein each of the two or more flywheels is configured to store rotational energy imparted by the respective motors and transfer that stored rotational energy to the projectile through direct engagement therewith;
activating an actuator to move two or more support arms;
de-activating the two or more motors driving the corresponding ones of the two or more flywheels in response to the activation of the actuator; wherein each of the two or more support arms support at a first end thereof a separate one of the two or more flywheels and each of the two or more support arms is supported at an opposed second end thereof by the base structure, wherein the movement of the two or more support arms collectively moves the two or more flywheels between an expanded position and a contracted position, wherein the two or more flywheels are closer to one another in the contracted position as compared to the expanded position, wherein the movement of the two or more propulsion wheels toward the contracted position is configured to bring the two or more flywheels into engagement with the projectile and drive the projectile from the holding area.

28. The method of claim 27, wherein the de-activation of the two or more motors coincides with the activation of the actuator.

29. The method of claim 27, further comprising:
loading another projectile in the holding area of the base structure of the actuated projectile launcher in response to the earlier projectile being driven from the holding area.

* * * * *